US012610155B2

(12) United States Patent
Osipov et al.

(10) Patent No.: US 12,610,155 B2
(45) Date of Patent: Apr. 21, 2026

(54) DEVICE AND METHOD FOR EXTENDED DEPTH OF FIELD IMAGING

(71) Applicant: Samsung Electronics Co., Ltd., Suwon-si (KR)

(72) Inventors: Alexey Aleksandrovich Osipov, Moscow (RU); Tatiana Igorevna Kopysova, Moscow (RU); Alexander Sergeevich Shlyapin, Moscow (RU); Dmitriy Evgenyevich Piskunov, Moscow (RU); Ksenia Yurievna Petrova, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 18/666,158

(22) Filed: May 16, 2024

(65) Prior Publication Data

US 2024/0305903 A1 Sep. 12, 2024

Related U.S. Application Data

(63) Continuation of application No. PCT/KR2022/016053, filed on Oct. 20, 2022.

(30) Foreign Application Priority Data

Dec. 15, 2021 (RU) ........................... RU2021137160

(51) Int. Cl.
*H04N 23/958* (2023.01)
*G02B 27/00* (2006.01)
(Continued)

(52) U.S. Cl.
CPC ....... *H04N 23/958* (2023.01); *G02B 27/0075* (2013.01); *G06T 5/50* (2013.01);
(Continued)

(58) Field of Classification Search
CPC ... H04N 23/55; H04N 23/958; G02B 27/0075
(Continued)

(56) References Cited

U.S. PATENT DOCUMENTS 5,715,031 A 2/1998 Roffman et al.
6,073,851 A 6/2000 Olmstead et al.
(Continued)

FOREIGN PATENT DOCUMENTS

EP 1 865 827 A0 9/2006
EP 1 978 394 A1 10/2008
(Continued)

OTHER PUBLICATIONS

Extended European Search Report dated Jan. 29, 2025, issued in European Application No. 22907664.1-1001.
(Continued)

*Primary Examiner* — Anthony J Daniels
(74) *Attorney, Agent, or Firm* — Jefferson IP Law, LLP

(57) ABSTRACT

A device and method for extended depth of field imaging are provided. The device includes an optical device configured to simultaneously form intermediate images of an object at different distances with a blur effect on at least parts of images of the object, the optical device comprising at least one optical element and at least two pupil zones formed to provide a predetermined distribution of optical powers and aberrations within each of the at least two pupil zones, based on which point spread function is formed, defined by a curve with minimized side peaks compared to a central peak in a given range of object distances, each of the at least two pupil zones corresponding to a respective given range of object distances and a respective given range of field angles, a sensor configured to simultaneously register the intermediate images formed by the optical device from different object distances and at different field angles, and an image proces-
(Continued)

T, relative units

——————— EDoF – lens with extended depth of field

— ·· — ·· — ·· FF – conventional lens (with constant focal length)

Near Medium Far
zone zone zone z, mm sor communicatively connected to the sensor and the optical device, wherein the image processor is configured to process the intermediate images of the object with the blur effect on at least parts of the images of the object registered by the sensor, the intermediate images being processed based on an obtained point spread function over the given range of object distances and field angles, and reconstruct resulting images without the blur effect at output regardless of object distances.

14 Claims, 39 Drawing Sheets

(51) Int. Cl.
    *G06T 5/50*            (2006.01)
    *G06T 5/73*            (2024.01)
    *H04N 23/55*        (2023.01)
    *G02B 9/62*          (2006.01)

(52) U.S. Cl.
    CPC .............. *G06T 5/73* (2024.01); *H04N 23/55*
               (2023.01); *G02B 9/62* (2013.01)

(58) Field of Classification Search
    USPC ...................................................... 348/207.99
    See application file for complete search history.

(56)             References Cited

U.S. PATENT DOCUMENTS

| | | | |
|---|---|---|---|
| 7,593,161 B2 | 9/2009 | George et al. | |
| 7,616,842 B2 | 11/2009 | Robinson | |
| 8,559,118 B2 | 10/2013 | Engelhardt et al. | |
| 8,985,767 B2 | 3/2015 | Spratt et al. | |
| 8,989,447 B2* | 3/2015 | Sezer ...................... | G06T 7/571 |
| | | | 382/106 |
| 9,325,971 B2* | 4/2016 | Cogswell ................ | G06T 7/571 |
| 11,022,815 B2 | 6/2021 | Weeber | |
| 2004/0145808 A1* | 7/2004 | Cathey, Jr. ............. | G02B 27/52 |
| | | | 359/558 |
| 2006/0050409 A1 | 3/2006 | George et al. | |
| 2007/0279618 A1 | 12/2007 | Sano et al. | |
| 2008/0007797 A1 | 1/2008 | Hayashi et al. | |
| 2008/0151388 A1* | 6/2008 | George ..................... | G06T 5/50 |
| | | | 359/707 |
| 2008/0195086 A1 | 8/2008 | Schroeder et al. | |
| 2009/0067680 A1 | 3/2009 | Dowski, Jr. et al. | |
| 2009/0297056 A1 | 12/2009 | Lelescu et al. | |
| 2010/0110275 A1 | 5/2010 | Mathieu | |
| 2010/0295973 A1 | 11/2010 | Aubuchon et al. | |
| 2010/0328517 A1 | 12/2010 | Mathieu | |
| 2011/0129165 A1 | 6/2011 | Lim et al. | |
| 2012/0162486 A1* | 6/2012 | Asakura .................... | G06T 5/73 |
| | | | 348/241 |
| 2012/0281132 A1 | 11/2012 | Ogura et al. | |
| 2016/0219216 A1 | 7/2016 | Kasahara | |
| 2016/0291230 A1* | 10/2016 | Weichelt ........... | G02B 27/0012 |
| 2019/0212478 A1 | 7/2019 | Zalevsky et al. | |
| 2019/0295226 A1 | 9/2019 | Klapp et al. | |
| 2021/0019911 A1 | 1/2021 | Kusakabe et al. | |
| 2021/0312596 A1 | 10/2021 | Hagiwara | |

FOREIGN PATENT DOCUMENTS

| | | | |
|---|---|---|---|
| JP | 2011-232606 A | 11/2011 |
| KR | 10-2011-0059247 A | 6/2011 |
| KR | 10-1747844 B1 | 6/2017 |
| WO | 2006/100086 A1 | 9/2006 |
| WO | 2009/106996 A2 | 9/2009 |

OTHER PUBLICATIONS

Russian Office Action dated Sep. 19, 2022, issued in Russian Application No. 2021137160/28(078222).
International Search report and written opinion dated Jan. 31, 2023, issued in International Application No. PCT/KR2022/016053.

* cited by examiner

E

E

Intermediate blurred image

PSF for conventional AF system

PSF for conventional EDoF system

PSF for present AF system

% DISTORTION

FIG. 23D

DEVICE AND METHOD FOR EXTENDED DEPTH OF FIELD IMAGING

CROSS-REFERENCE TO RELATED APPLICATION(S)

This application is a continuation application, claiming priority under § 365(c), of an International application No. PCT/KR2022/016053, filed on Oct. 20, 2022, which is based on and claims the benefit of a Russian patent application number 2021137160, filed on Dec. 15, 2021, in the Russian Intellectual Property Office, the disclosure of which is incorporated by reference herein in its entirety.

BACKGROUND

1. Field

The disclosure relates to methods and devices for extended depth of field imaging. More particularly, the disclosure relates to devices used for capturing photo and video with smartphone cameras, and in tablet computers running Android, IOS, HarmonyOS and similar operating devices, and in other similar devices requiring the provision of extended depth of field.

2. Description of Related Art

A variety of imaging means exist in the art which provide extended depth of field.

The following patent publications can be related to this group.

An imaging system with optimized extended depth of focusing is described in application US20190212478A1, publ. 11 Sep. 2019, IPC G02B3/00, wherein an optical processor includes a pattern in the form of spaced apart regions of different optical properties. The pattern is configured to define two phase masks in the form of a phase coder and a dispersion profile coder. The phase coder affects profiles of modulation transfer function (depending on defocusing), increasing depth of focusing of the lens unit, as a result wavelength components of the transfer function are shifted relative to each other. The dispersion profile coder compensates for this shift. Drawbacks of this disclosure include a lot of optical components in the imaging system, particularly, an imaging lens unit, two phase masks, which affect quality of the image produced. Furthermore, as clearly illustrated in the plot of FIG. 4B of US20190212478, the transfer function profile obtained in the system is nonuniform, which makes subsequent image processing difficult, in addition no means for deblurring the resulting image are disclosed.

U.S. Pat. No. 7,593,161B2, publ. 22 Sep. 2009, IPC G02B 5/02, describes an apparatus and method for extended depth of field imaging. Extended depth of field is achieved by a computational imaging system that combines a multifocal imaging subsystem for producing a blurred intermediate image with a digital processing subsystem for producing a recovered image having an extended depth of field. The multifocal imaging system preferably exhibits spherical aberration as the dominant feature of the purposeful blur. A central obscuration of the multifocal imaging subsystem renders point spread functions of object points more uniform over a range of object distances. An iterative digital deconvolution algorithm for converting the intermediate image into the recovered image contains a metric parameter that increases the algorithm efficiency and enhances image quality. Drawbacks of the above include a lot of optical components in the multifocal imaging system, which affect the resulting image quality. Furthermore, only spherical aberration is used to increase the depth of field, and no image processing means are provided to deblur the image produced.

U.S. Pat. No. 7,616,842B2, 10 Nov. 2009, IPC G06K7/00, describes a method and system for designing an imaging system including an optical subsystem, a detector subsystem and a digital image processing subsystem that includes at least one digital filter, the method includes predicting end-to-end imaging performance using a spatial model for the source and models for the optical subsystem, the detector subsystem and the digital image processing subsystem. The optical subsystem and digital image processing subsystems are jointly designed taking into account characteristics of the entire system. The intermediate image produced by the optical subsystem is not required to be high quality since the quality may be corrected by the digital image processing subsystem.

However this solution provides a design method, rather than an optical system for extended depth of field imaging (EDoF).

U.S. Pat. No. 11,022,815B2, publ. 1 Jun. 2021, IPCG02C 7/02, describes systems and methods for providing improved image quality across a wide and extended range of foci, which encompass vision treatment techniques and ophthalmic lenses such as contact lenses and intraocular lenses (IOLs). An IOL includes first and second lens surfaces. The first or second lens surface represents a refractive surface with an aspheric profile or diffractive profile. The refractive surface with aspheric profile can focus light toward a far focus. The surface with diffractive profile can include a central zone that distributes a first percentage of light toward a far focus and a second percentage of light toward an intermediate focus. The diffractive profile can also include a peripheral zone, surrounding the central zone, which distributes a third percentage of light toward the far focus and a fourth percentage of light toward the intermediate focus. The disclosure is intended for medical use only in contact and intraocular lenses and does not provide for image processing means to deblur the image produced.

U.S. Pat. No. 5,715,031A, publ. 3 Feb. 1998, IPC G02C7/04, describes concentric aspheric multifocal lens designs which use a combination of an aspheric front surface, which results in aberration reduction and contrast vision enhancement, along with a concentric multifocal back surface, to produce a lens design which affords clear vision at a distance and also near without a loss in contrast. The aspheric surface improves the modulation transfer function (MTF) of the lens eye combination which improves the focus and contrast of both distance and near images. The designs are intended for medical use only in contact and intraocular lenses and does not provide for an image processing means to deblur the produced image.

U.S. Pat. No. 8,985,767B2, publ. 24 Mar. 2015, IPC G02C 7/02, describes a method for designing a progressive lens, including obtaining a wavefront measurement of an eye, determining an initial design for the progressive lens based on the wavefront measurement, determining information about how changes in one or more higher order aberrations of the eye affect a second order correction for the aberrations of the eye based on information derived from the wavefront measurement. The obtained information is used for modifying the initial design of the progressive lens to provide a final progressive lens design, and outputting the final lens design. The disclosure is intended for medical use only for eye correction, and does not relate to systems for extended depth of field.

A European patent application EP01865827, publ. 19 Dec. 2007, IPC A61B 3/103, describes a method and device for modifying optical system properties by means of a continuous multifocal profile, wherein said profile includes a component for increasing the optical system focal depth, and is computed according to a fourth-order Zernike polynom. To avoid the eye base refraction, said focal depth increasing component is also computed according to the second-order Zernike polynom. The disclosure is intended for medical use only for contact lenses and intraocular lenses, and only fourth-order and second-order Zernike polynoms are used, but no deblur system is provided for the image produced.

A Japanese patent application JP2011232606, publ. 17 Nov. 2011, IPC G01B 11/24, describes a camera, an optical system, and interchangeable lens with birefringent device. The birefringent device is adapted to selectively attenuate the side peak (side lobes) in the out-of-focus point spread function of the lens unit. This optical system requires additional optical units, in particular a birefringent device, which significantly increases its cost.

Optical system with extended depth of field, described in U.S. Pat. No. 8,559,118, publ. 15 Oct. 2013, IPC G02B 13/18, is regarded as the closest prior art of the disclosure. The optical system yields an asymmetric modulation transfer function (MTF). In some aspects, the asymmetric MTF results in extended depth of field for near field objects. The optical system includes a set of lenses (e.g. four lenses or five lenses), a first lens having a positive refractive power, with both the surface facing the object side and the surface facing the image side having convex shapes, a second lens having a negative refractive power and a meniscus shape, with the surface facing the object side having a concave shape near the optical axis and the surface facing the image side having a convex shape near the optical axis, a third lens, and a fourth lens having a meniscus shape near the optical axis, with the surface facing the object side having a convex shape near the optical axis and the surface facing the image side having a concave shape near the optical axis. The length of the optical system remains below about 5.3 millimeters (mm). The optical systems can be used for a high resolution compact camera, for example, in combination with an electronic computing device, a communication device, a display device, surveillance equipment, or the like. In this device, special lens shapes are used, and the inventors thereby try to provide the required optical characteristics of the device. However, operating only with the shape of the lenses, it is not possible to obtain invariant optical characteristics depending on the object distance. Drawback of this optical system is a small depth of field and nonuniform modulation transfer function depending on out-of-focus position.

As opposed to the closest prior art (i.e., U.S. Pat. No. 8,559,118), where a specific lens shape is used for extended depth of field, the inventive imaging device uses a multizone optical unit with each zone working at its own depth. The prior art optical system forms point spread function with side lobes, which leads to image distortions of far point objects, they are formed with ring or half ring-shape halos. The present multizone optical device overcomes this problem. Moreover, although the closest prior art provides for the presence of an image processing unit, details of its implementation and operation algorithm are not described in U.S. Pat. No. 8,559,118. The inventors of the disclosure use an image processing unit to reconstruct a blurred intermediate image based on the Point Spread Function (PSF) or modulation transfer function (MTF) of the optical imaging device, and parameters of the optical unit and the image processing unit are computed jointly using end-to-end optimization methods.

PRIOR ART

A—Conventional technical solutions (U.S. Pat. Nos. 11,022,815B2, 5,715,031A, 8,985,767, EP01865827B1, used in ophthalmology), provide vision correction, create image on retina, are used in contact lenses, IOLs and eyeglasses, include an imaging system, which is a single lens working together with the eye, focal length of the imaging system is generally over 150 mm, optical unit includes single lens only and no image processing is provided, and form image at far and near distances, which requires accommodation of the user's eye.

B—Conventional solutions (US20190212478, U.S. Pat. Nos. 7,593,161, 8,559,118, used in systems for extended depth of field imaging).

1) optical system has a lot of optical parts (special-shaped lenses, phase masks,) that make up the imaging system, which affect quality of the image being formed and the system cost;

2) obtained modulation transfer function (MTF) profile is nonuniform, which makes subsequent image processing difficult;

3) optical system forms point spread function (PSF) with side lobes, which leads to image distortions of far point objects (they are formed with ring-shaped halos);

4) no image processing unit is provided, or if provided, aspects of its operation algorithm in conjunction with optical system are not disclosed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for extended depth of field imaging.

Another aspect of the disclosure is to provide a method and device for extended depth of field imaging.

Furthermore, the inventors have developed a method and device that eliminate drawbacks of conventional methods for extended depth of field imaging and offer the following advantages: optical system for smartphone's camera with extended depth of field (EDoF) without autofocus; no focusing delay; fast reconstruction algorithm; no need of user interaction (no need to select a focus area); and cheap compact optical unit of the inventive imaging device, applicable for mass-production.

Another aspect of the disclosure is to provide a method and device for extended depth of field imaging without additional optical elements, forming high-quality images after processing by artificial neural networks using point spread function information.

Main challenges of conventional designs in the field of smartphone cameras, conventional autofocus cameras use moving parts, such as an electromagnetic drive to move camera lens relative to the sensor, which leads to autofocus delay and bulky design, existing cameras without autofocus apply additional optical elements, such as phase plates, to provide extended depth of field, which leads to additional manufacturing costs.

It should be noted that conventional autofocus systems have moving mechanical parts (motor, cam, gear) for lens displacement to focus on the object, which leads to focusing delay and affects quality of capturing fast moving objects. In addition, in some autofocus (AF) systems, user interaction is required to manually select focus area and adjust focus position to avoid possible autofocus errors.

Moreover, in conventional AF systems, when pointed at a target object and forming sharp image of the object, unnatural blurred background image in the form of oval, ring or semi-ring halos (donut-shape bokeh) is observed.

Additional aspects will be set forth in part in the description which follows and, in part, will be apparent from the description, or may be learned by practice of the presented embodiments.

In accordance with an aspect of the disclosure, a device for extended depth of field imaging is provided. The device includes an optical device configured to simultaneously form intermediate images of an object at different distances with a blur effect on at least parts of images of the object, the optical device comprising at least one optical element and at least two pupil zones formed to provide a predetermined distribution of optical powers and aberrations within each of the at least two pupil zones, based on which point spread function is formed, defined by a curve with minimized side peaks compared to a central peak in a given range of object distances, each of the at least two pupil zones corresponding to a respective given range of object distances and a respective given range of field angles, a sensor configured to simultaneously register the intermediate images formed by the optical device from different object distances and at different field angles, and an image processor communicatively connected to the sensor and the optical device, wherein the image processor is configured to process the intermediate images of the object with the blur effect on at least parts of the images of the object registered by the sensor, the intermediate images being processed based on an obtained point spread function over the given range of object distances and field angles, and reconstruct resulting images without the blur effect at output regardless of object distances.

Moreover, the minimized side peaks of the point spread function, formed by the optical device, do not exceed 10% of the central peak in the given range of object distances.

According to the disclosure, the given range of object distances is from 400 millimeters (mm) to 5000 mm, and the given range of field angles is from −40 to +40 degrees.

Furthermore, the optical device is further configured to form an invariant point spread function independent of an object distance over the given range of object distances, independent of a field angle, or independent of a field angle and an object distance.

The optical device is further configured to form a uniform modulation transfer function (MTF) independent of an object distance.

Furthermore, the optical device is further configured to simultaneously form intermediate images of the object at different distances with the blur effect on an entire image of the object, and the at least one optical element comprises at least one of a lens with different surface profiles, a composite lens, a diffractive optical element, a holographic optical element, a polarizing element, or an amplitude-phase mask.

One or more lenses of the optical device comprises at least one of an aspheric surface or a Zernike surface, which provide aberration correction.

Moreover, according to an embodiment of the disclosure, optical elements of the optical device comprise, arranged along an optical axis from an object side toward an image surface, a first lens, a second lens, a third lens, a fourth lens, a fifth lens, and a sixth lens, wherein the first lens has a positive refractive power, with a surface facing the object side having a convex shape and a surface facing the image side having a concave shape, wherein the second lens has a negative refractive power and with both a surface facing the object side and a surface facing the image side having the concave shape, wherein the third lens has a positive refractive power, wherein the fourth lens has a meniscus shape, and wherein each of the fifth and sixth lenses has the meniscus shape near the optical axis, with a surface facing the object side having the convex shape near the optical axis and a surface facing the image side having the concave shape near the optical axis.

Moreover, in the optical device, the composite lens is at least one of a bifocal lens, a progressive lens, a Fresnel lens, or combinations thereof, the diffractive optical element is a diffractive microstructure designed to provide amplitude-phase modulation of transmitted or reflected light, and the holographic element is designed and arranged to contribute to elimination of chromatic aberrations.

Moreover, the polarizing element is a polarizer and/or a phase plate and/or a polarizing filter, wherein the polarizing element, such as a polarizer and/or a phase plate, is configured to ensure multiple passage of light through optical elements of the optical unit, and the polarizing element includes a polarizing filter configured to eliminate glare.

It should be noted that in the device according to the disclosure the amplitude-phase mask is made and arranged in the optical unit to provide a phase delay or amplitude modulation of light to ensure uniform modulation transfer coefficient over required image depth, and the amplitude-phase mask is one of a fourth-degree parabola phase profile mask, a cubic phase mask, and a mask with concentric annular holes in the screen.

Moreover, each optical element of the optical unit is made of an optically transparent material selected from at least one of optical glass, optical crystal, or a polymer.

The device according to the first aspect of the disclosure can include a shutter disposed in the plane of aperture diaphragm or the imaging device plane conjugate with it, and the shutter is configured to control opening or closing of given number of pupil zones.

The sensor is a matrix photodetector, in particular, a CMOS matrix photodetector or a CCD sensor, configured to detect electromagnetic radiation in the range of 0.4-0.7 micrometers (μm), and the sensor pixel size is from 0.7 μm to 1.5 μm.

The image processing unit is configured to process intermediate images of the object and reconstruct resulting images at output based on a convolutional neural network and/or Wiener filter, parameters of which are predetermined based on design parameters of the optical unit and the sensor.

Parameters of the optical unit include at least one of radii of surfaces of the optical elements, coefficients of aspheric surfaces of the optical elements, thicknesses of the optical elements, refractive indices of materials of the optical elements, amount of dispersion of the optical elements, distances between optical elements in the optical unit, device length representing axial distance between surface of the first optical element on the object side and image surface on the sensor, and parameters of the sensor include at least one of spectral sensitivity, noise, sampling parameters.

In accordance with another aspect of the disclosure, a device for extended depth of field imaging is provided. The device includes an optical device configured to simultaneously form intermediate images of an object at different distances with a blur effect on at least parts of images of the object, the optical device comprising a set of optical elements and at least two pupil zones formed to provide a predetermined distribution of optical powers and aberrations within each of the at least two pupil zones, based on which point spread function is formed, defined by a curve with minimized side peaks compared to a central peak in a given range of object distances, each of the at least two pupil zones corresponding to a respective given range of object distances and a respective given range of field angles, wherein the set of optical elements contains, arranged along an optical axis from an object side toward an image surface, a first lens, a second lens, a third lens, a fourth lens, a fifth lens, and a sixth lens, wherein the first lens has a positive refractive power, with a surface facing the object side having a convex shape and a surface facing the image side having a concave shape, wherein the second lens has a negative refractive power, with both a surface facing the object side and a surface facing the image side having the concave shape, wherein the third lens has a positive refractive power, wherein the fourth lens has a meniscus shape, and each of the fifth and sixth lenses has the meniscus shape near the optical axis, with a surface facing the object side having the convex shape near the optical axis and a surface facing the image side having the concave shape near the optical axis, a sensor configured to simultaneously register the intermediate images formed by the optical device from different object distances and at different field angles, and an image processor communicatively connected to the sensor and the optical device, wherein the image processor is configured to process the intermediate images of the object with the blur effect on at least parts of the images of the object registered by the sensor, the intermediate images being processed based on an obtained point spread function over the given range of object distances and field angles, and reconstruct resulting images without the blur effect at output regardless of object distances.

Moreover, the minimized side peaks of point spread function, formed by the optical device, do not exceed 10% of central peak over the given range of object distances.

According to the disclosure, the given range of object distances is from 400 mm to 5000 mm, and the given range of field angles is from −40 to +40 degrees.

Furthermore, the optical device is configured to form an invariant point spread function independent of object distances over the given range of object distances, independent of a field angle, or independent of a field angle and object distances.

The optical device is further configured to form a uniform curve of modulation transfer function (MTF) independent of object distances.

Moreover, in the device according to an aspect of the disclosure, the optical device is further configured to simultaneously form intermediate images of an object at different distances with the blur effect on an entire image of the object.

Moreover, each optical element of the optical device is made of an optically transparent material selected from at least one of optical glass, optical crystal, and a polymer.

According to an aspect of the disclosure, the device includes a shutter disposed in a plane of an aperture diaphragm or an imaging device plane conjugate with it, and the shutter is configured to control an opening or closing of a given number of pupil zones.

In the device, the sensor is a matrix photodetector, or a CMOS sensor or CCD sensor, which is configured to detect electromagnetic radiation in the range of 0.4-0.7 μm, and the sensor pixel size is from 0.7 μm to 1.5 μm.

The image processor is further configured to process intermediate images of an object and reconstruct resulting images at output based on at least one of a convolutional neural network or Wiener filter, parameters of which are predetermined based on parameters of the optical device and the sensor.

Parameters of the optical device include at least one of radii of surfaces of the optical elements, coefficients of aspheric surfaces of the optical elements, thicknesses of the optical elements, refractive indices of materials of the optical elements, amount of dispersion of the optical elements, distances between optical elements in the optical unit, device length representing axial distance between surface of the first optical element on the object side and image surface on the sensor, and parameters of the sensor include at least one of spectral sensitivity, noise, sampling parameters.

In accordance with another aspect of the disclosure, a method for extended depth of field imaging is provided. The method includes simultaneously forming intermediate images of an object at different distances with a blur effect on at least parts of images of the object by an optical device having at least two pupil zones formed to provide a predetermined distribution of optical powers and aberrations within each of the at least two pupil zones, on the basis of which a point spread function is formed, defined by a curve with minimized side peaks compared to a central peak over a given range of object distances, wherein each of the at least two pupil zones corresponds to a respective given range of object distances and a respective given range of field angles, registering, by a sensor, the intermediate images simultaneously formed by the optical device from different object distances and at different field angles, processing, by an image processor, the intermediate image of the object with the blur effect on at least parts of the images of the object based on an obtained point spread function over the given range of object distances and field angles, and reconstructing resulting images without the blur effect regardless of object distances.

Moreover, the minimized side peaks of the point spread function formed by the optical device do not exceed 10% of central peak in the given range of object distances.

According to the disclosure, the given range of object distances is from 400 mm to 5000 mm, and the given range of field angles is from −40 to +40 degrees.

Furthermore, the optical device is further configured to form an invariant point spread function independent of object distances over the given range of object distances, independent of a field angle, or independent of a field angle and object distances.

The optical device is further configured to form a uniform modulation transfer function (MTF) independent of object distances.

Furthermore, in the device according to an aspect of the disclosure, the optical device is further configured to simultaneously form intermediate images of an object at different distances with the blur effect on an entire image of the object.

The image processor is further configured to process the intermediate images of the object and reconstruct resulting images at output based on at least one of a convolutional neural network or Wiener filter, parameters of which are predetermined based on parameters of the optical device and the sensor.

Parameters of the optical device include at least one of radii of surfaces of the optical elements, coefficients of aspheric surfaces of the optical elements, thicknesses of the optical elements, refractive indices of materials of the optical elements, amount of dispersion of the optical elements, distances between optical elements in the optical device, or device length representing axial distance between surface of the first optical element on the object side and image surface on the sensor, and parameters of the sensor include at least one of spectral sensitivity, noise, or sampling parameters.

The following presents basic advantages and distinctive features of the disclosure over the prior art. The disclosure provides a device for extended depth of field imaging (EDoF), is used in smartphone cameras and similar devices, only data from current frame is required to reconstruct image and information about device characteristics (point spread function or modulation transfer function), imaging device includes an optical unit with a matrix sensor and an image processing unit, focal length of the imaging device is generally less than 100 mm, preferably about 3 mm in a smartphone camera, optical unit generally includes more than two lenses and forms an intermediate blurred image on the sensor, multizone optical unit is used, with each zone working at its own depth, and the disclosure ensures sharp image of an object, regardless of object distance, in addition, there are no boundaries between parts of the image and image resolution does not change over the field of view.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A shows a scene at the instant of capturing image with smartphone, FIG. 3Bb shows is a diagram of the disclosure (Key Position 1 and Key Position 2), and FIG. 3C is a scene image after processing a captured image according to various embodiments of the disclosure;

Figure 4:
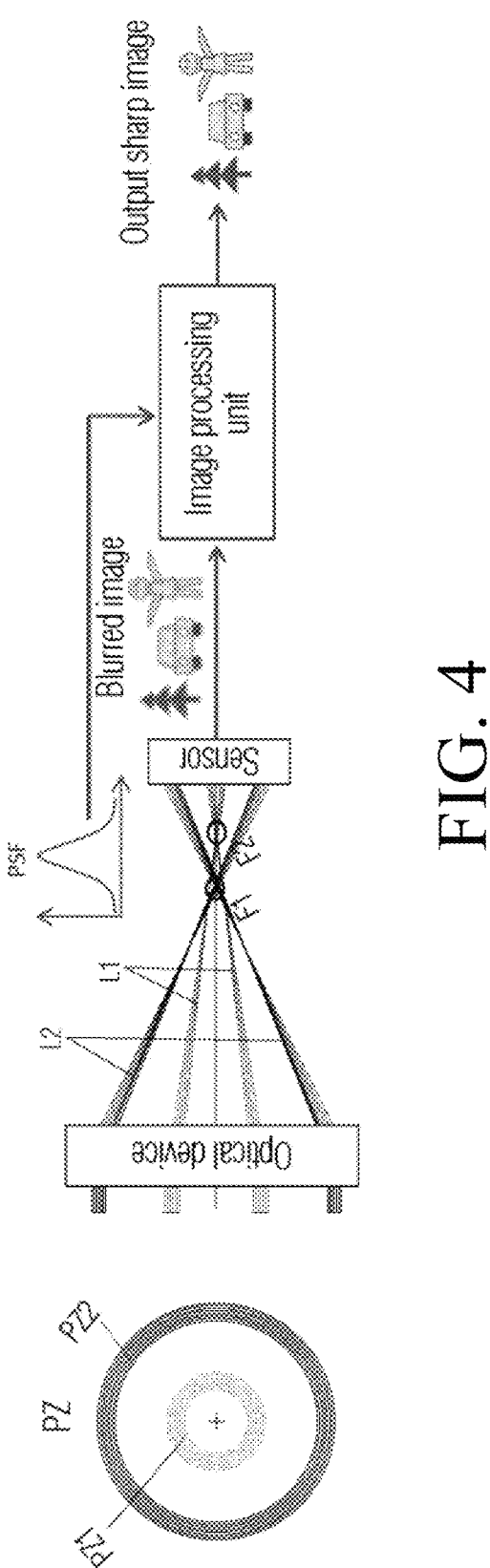
Figure 5A:
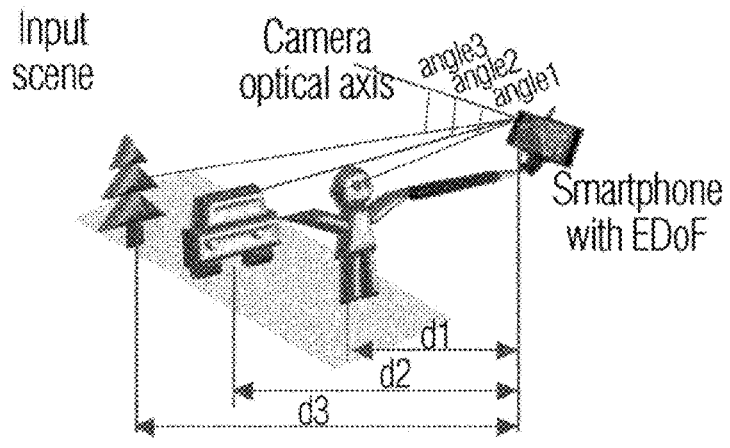
Figure 5B:
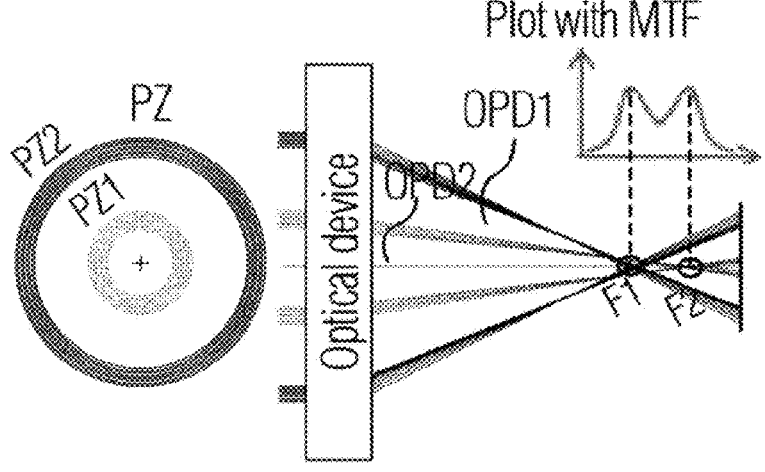
Figure 5C:
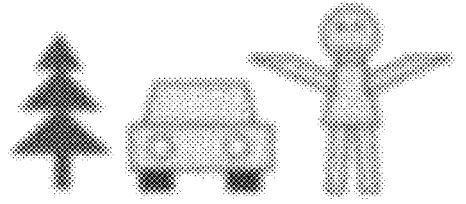
Figure 6A:
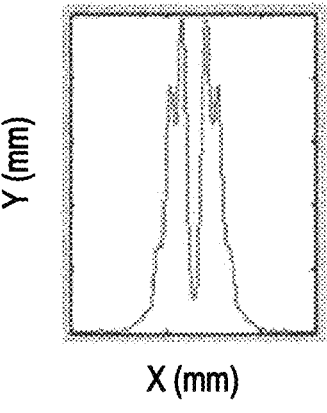
Figure 6B:
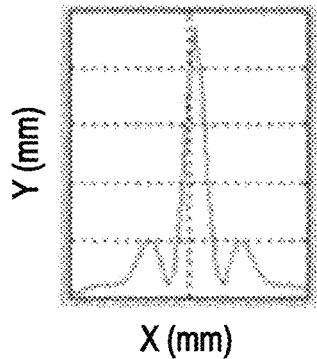
Figure 6C:
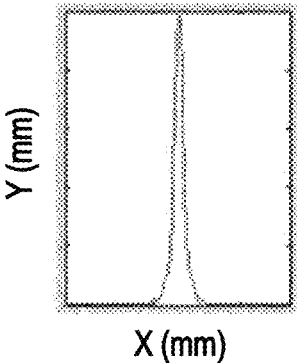
Figure 7:
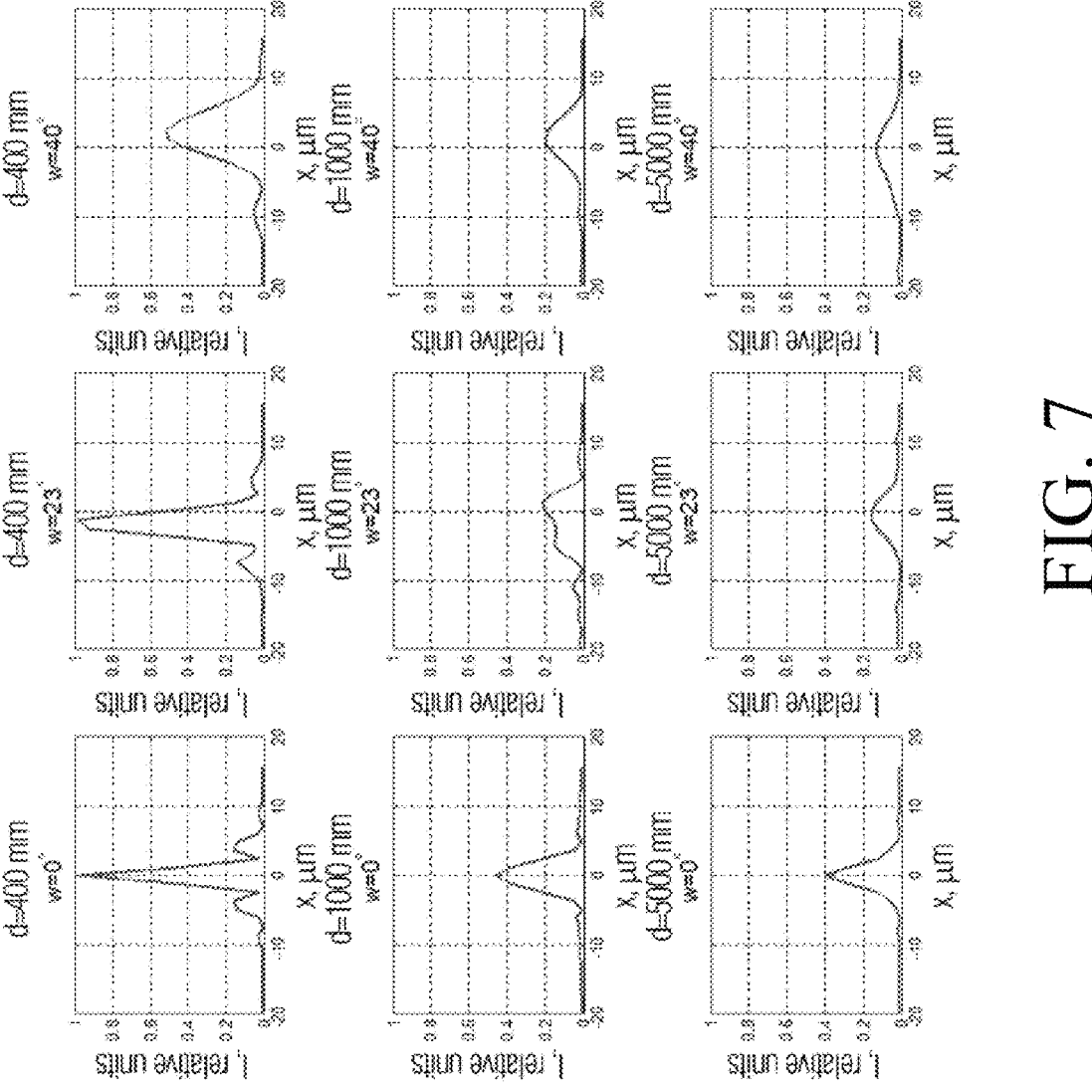
Figure 8:
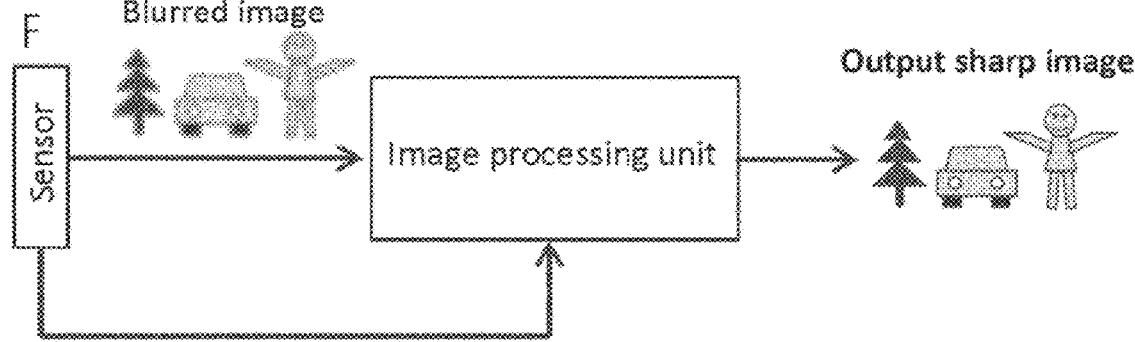
Figure 9A:
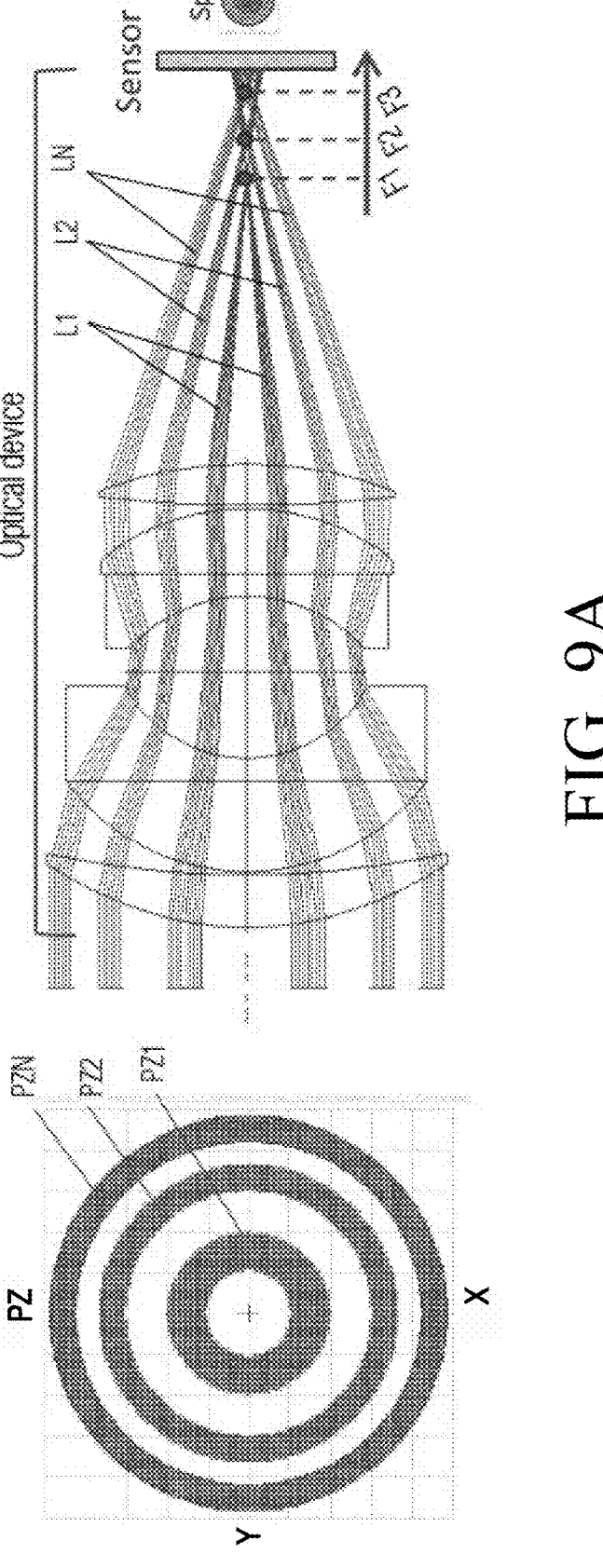
Figure 9B:
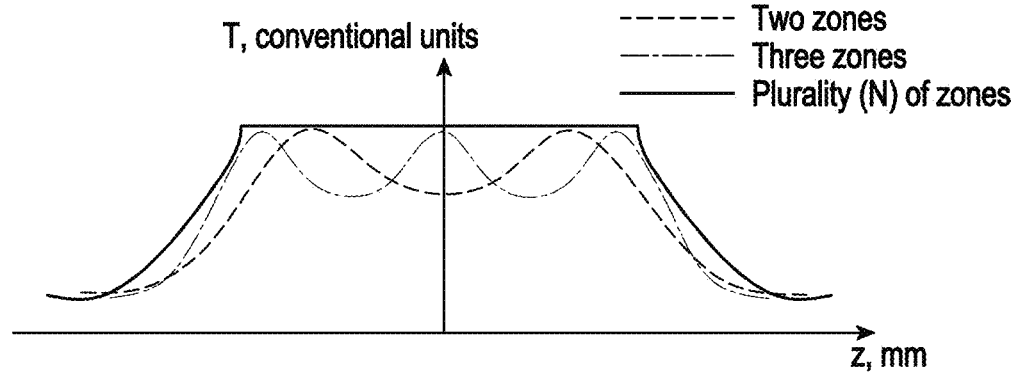
Figure 10:
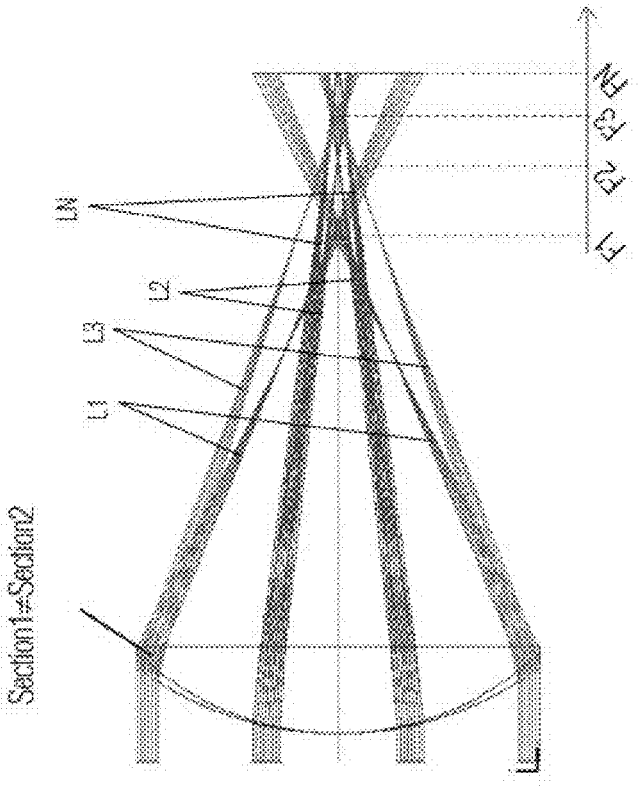
Figure 10:
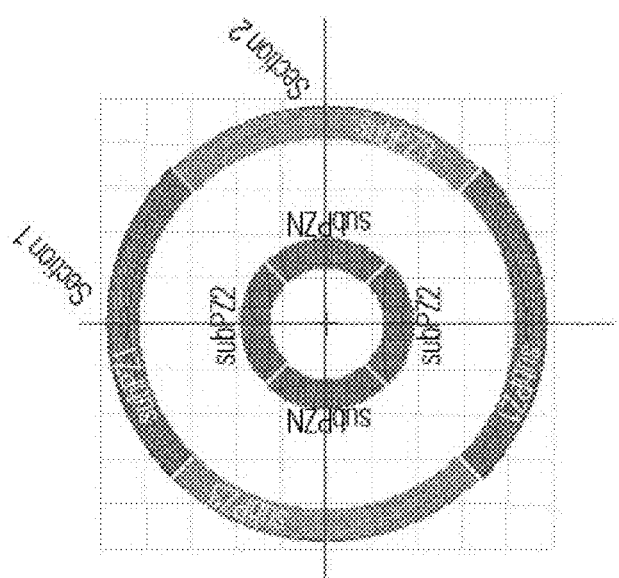
Figure 11A:
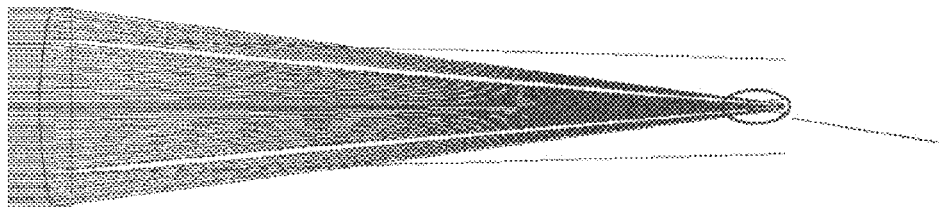
Figure 11B:
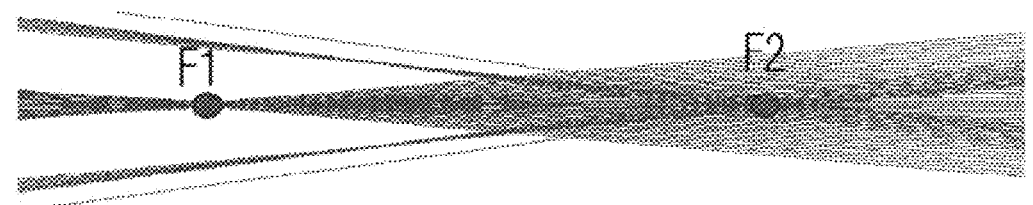
Figure 11C:
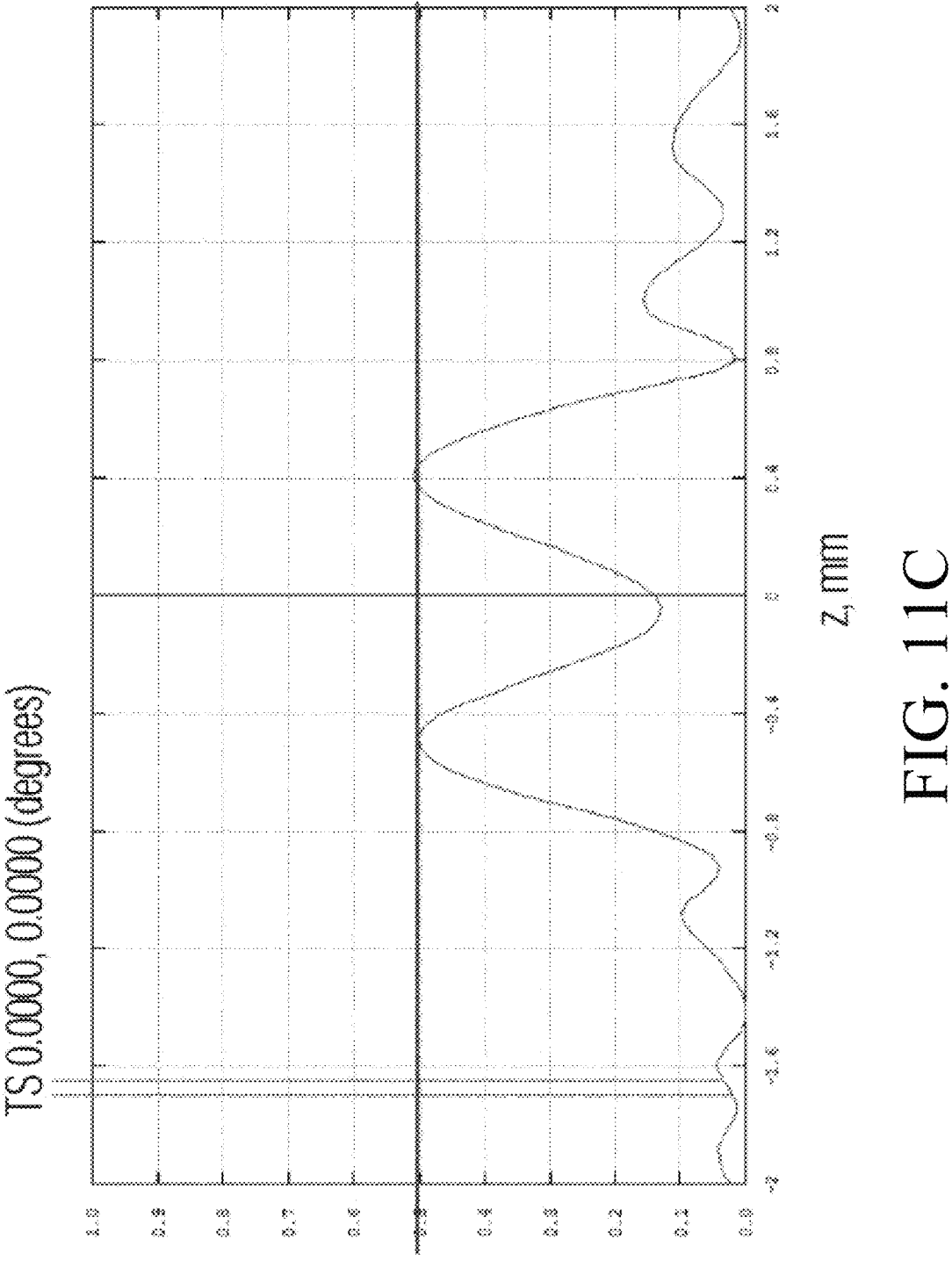
Figure 12A:
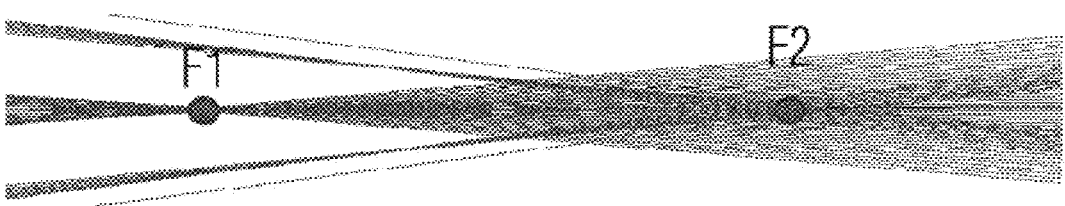
Figure 12B:
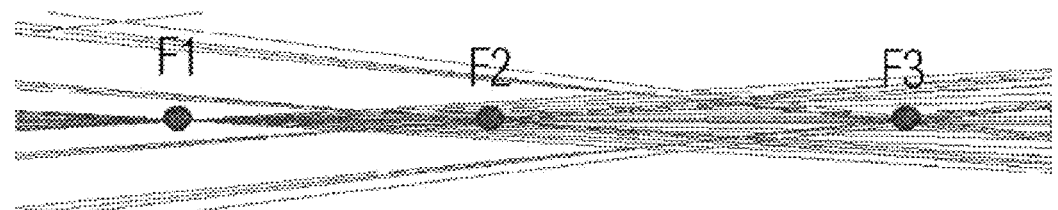
Figure 12C:
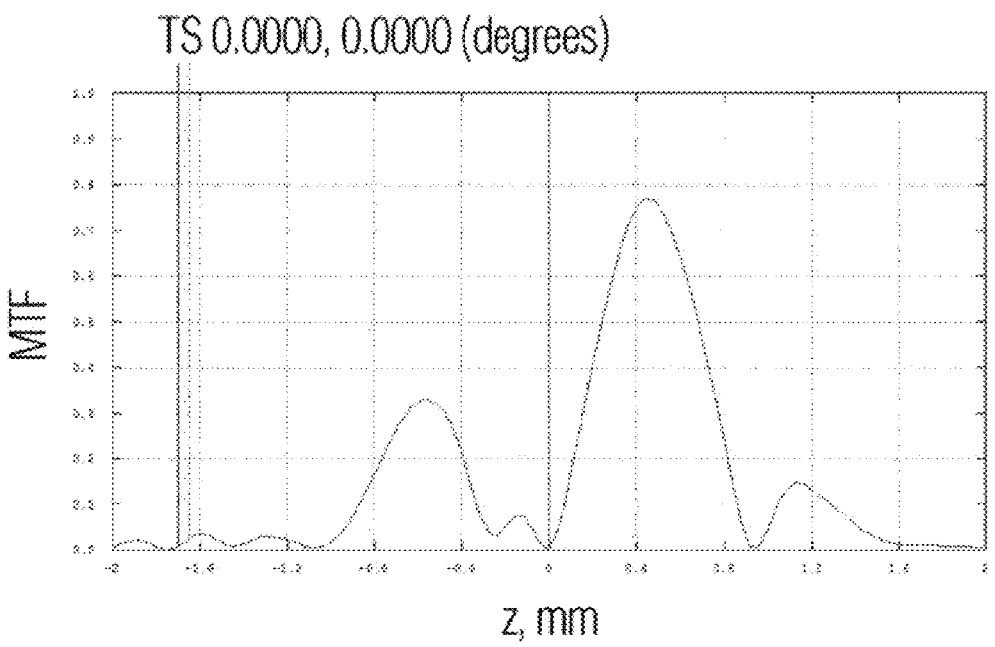
Figure 12D:
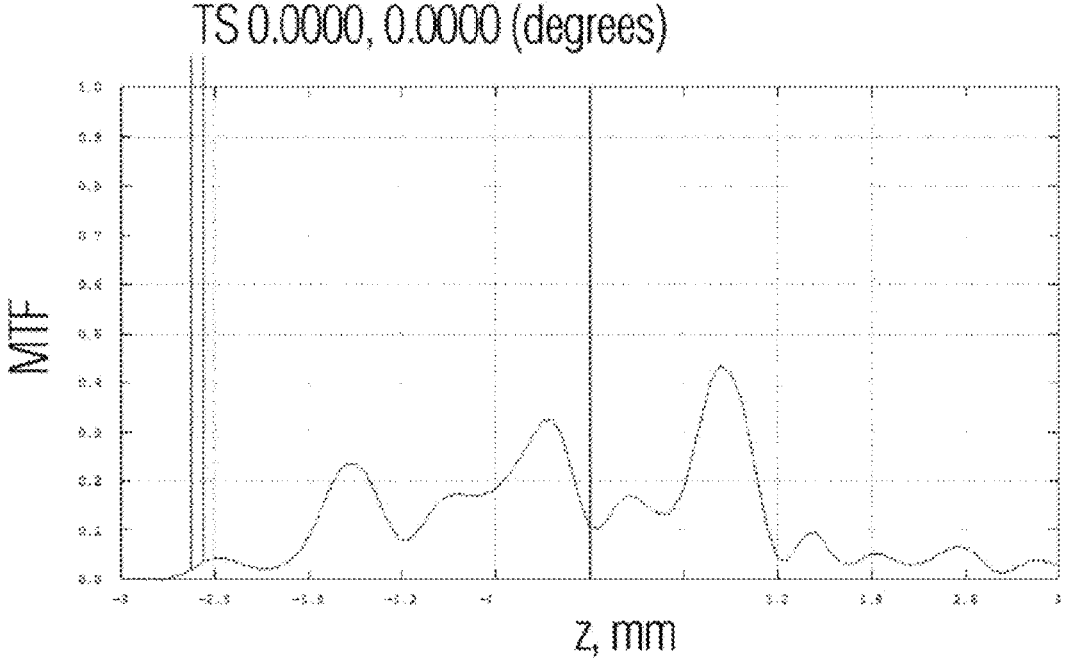
Figure 13:
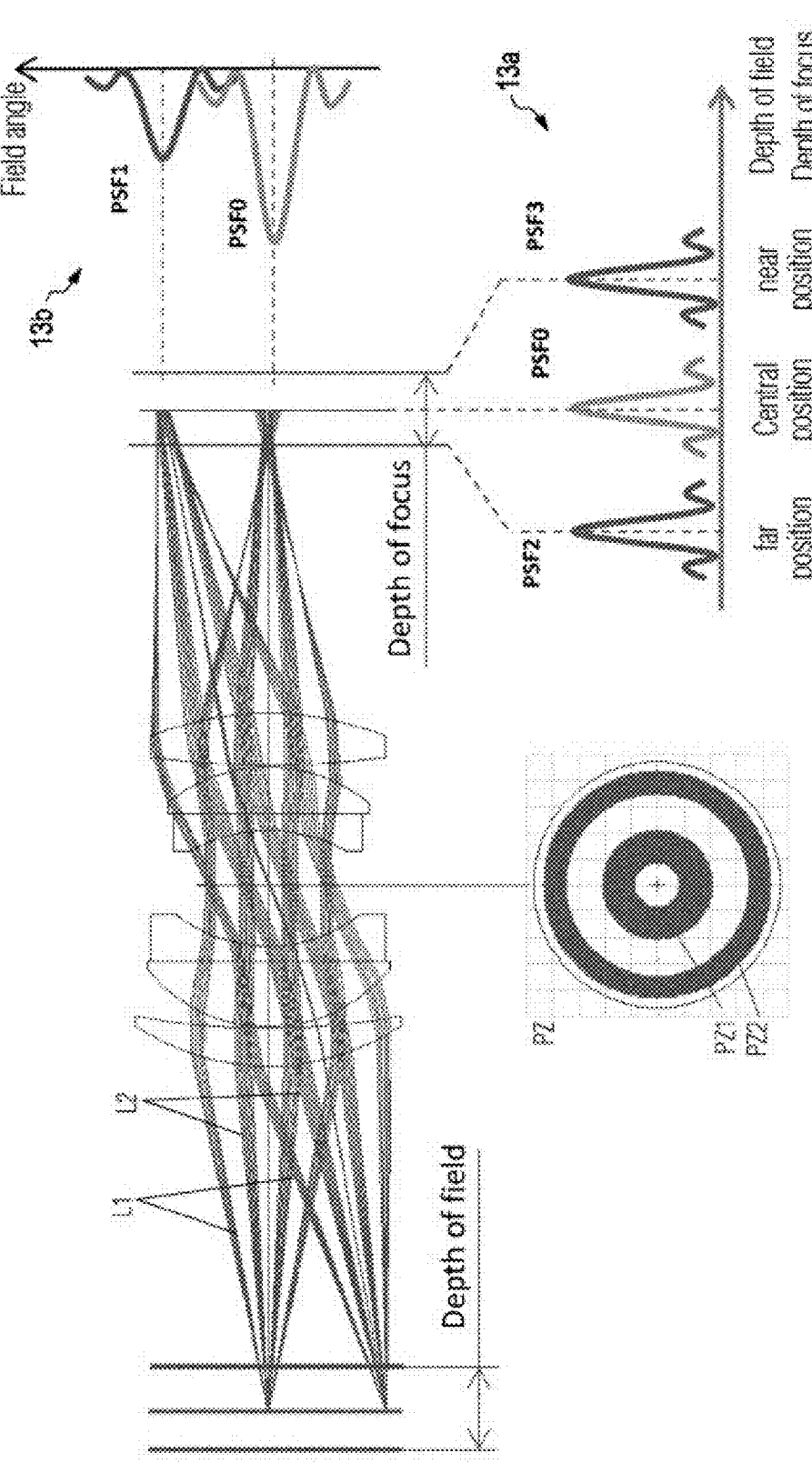
Figure 14:
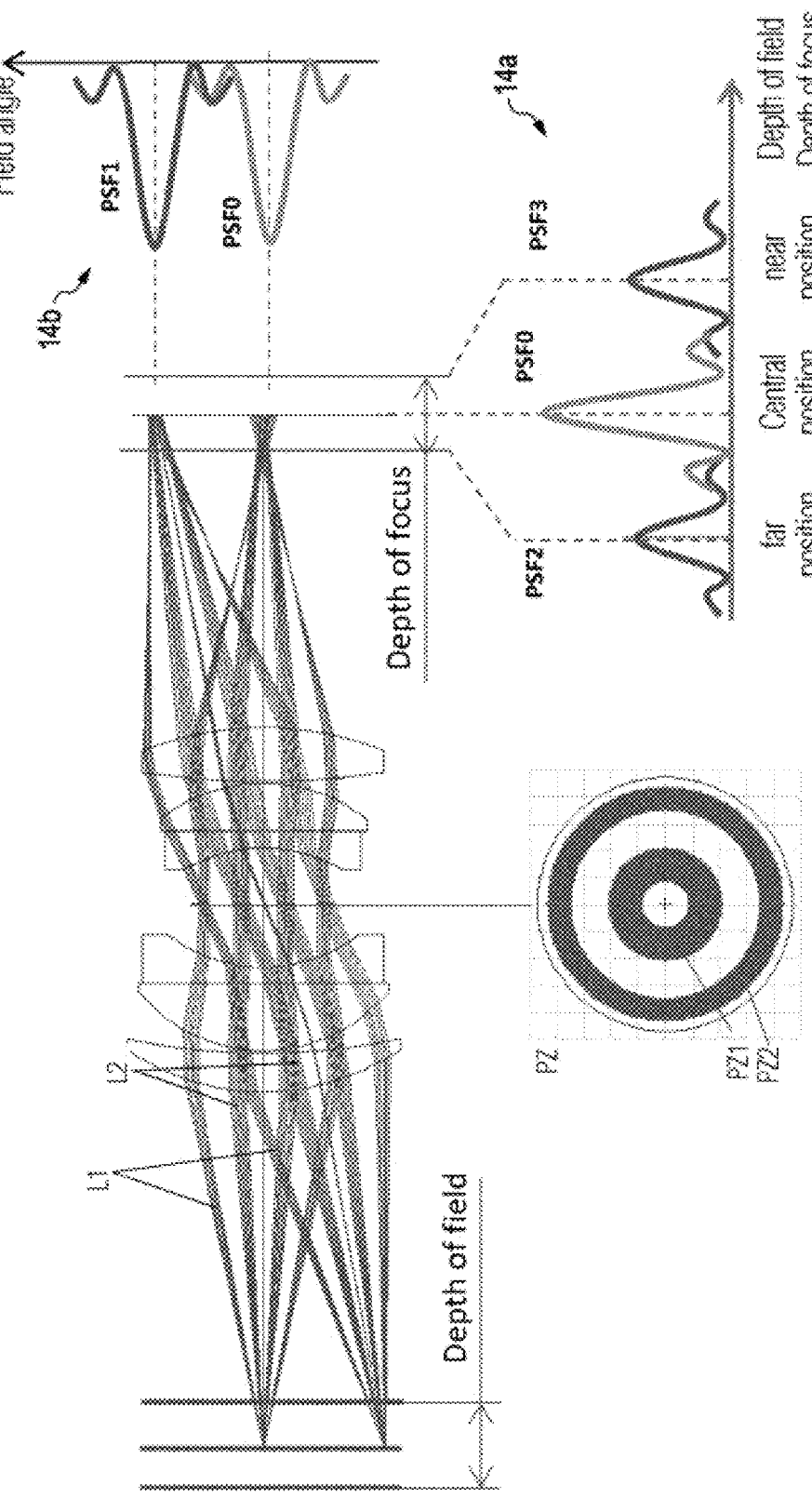
Figure 15A:
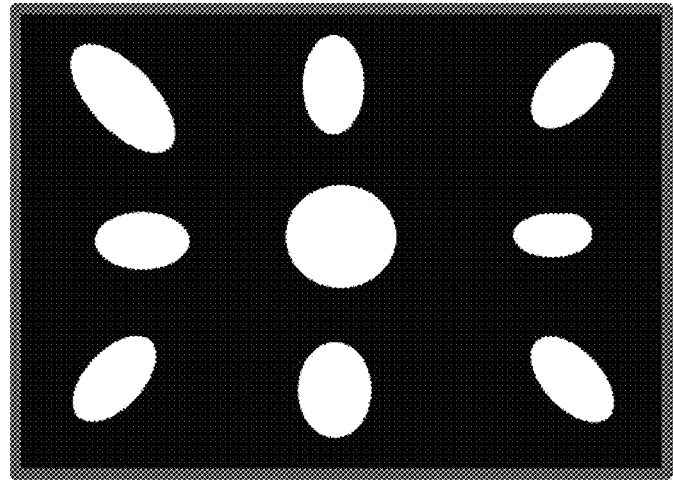
Figure 15B:
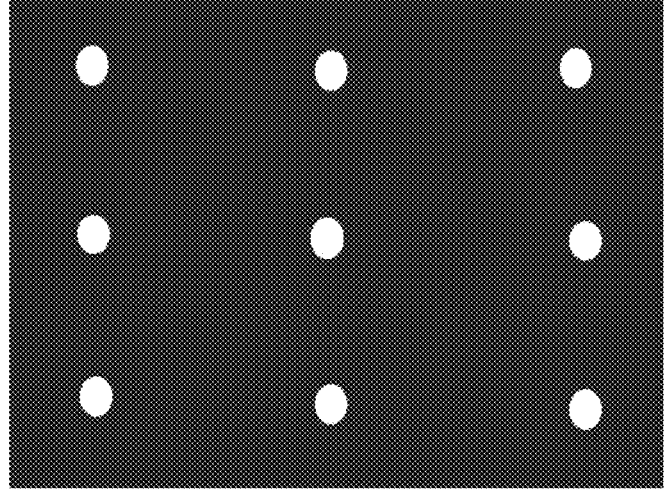
Figure 15C:
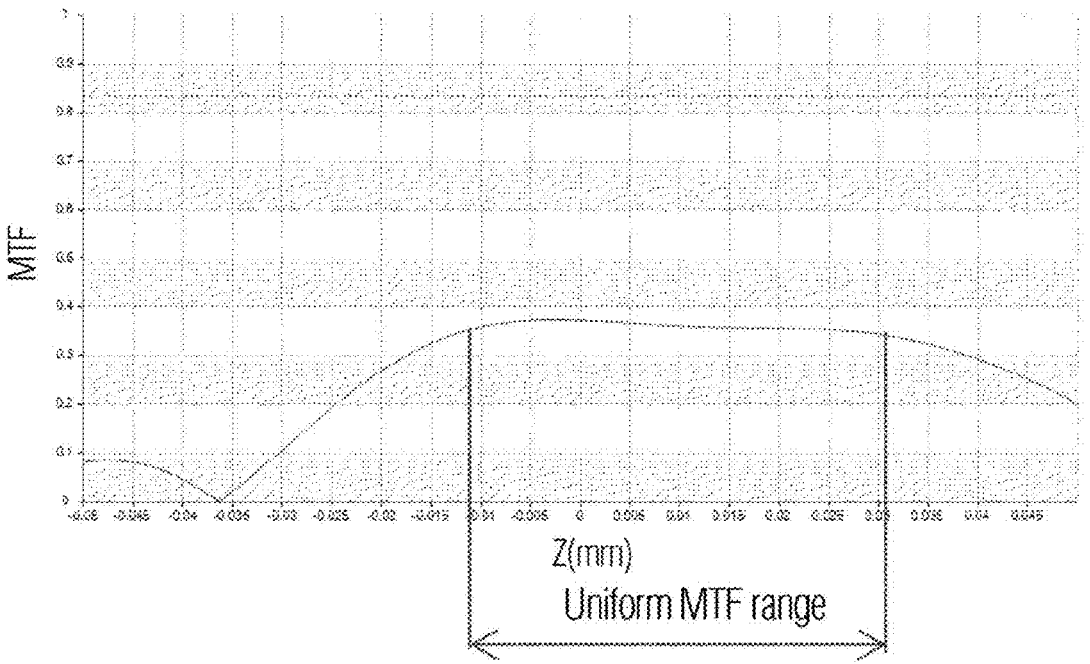
Figure 16A:
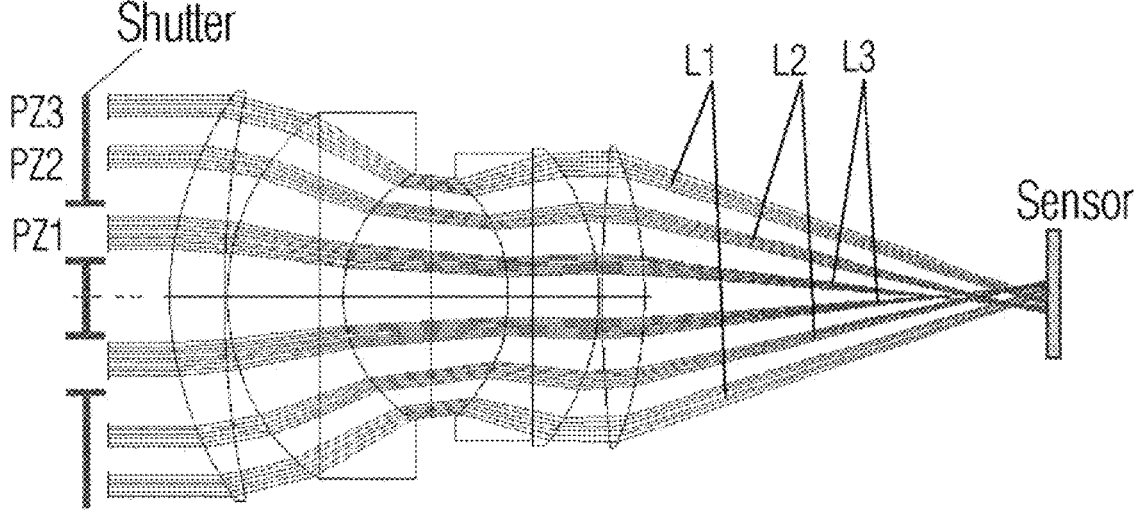
Figure 16B:
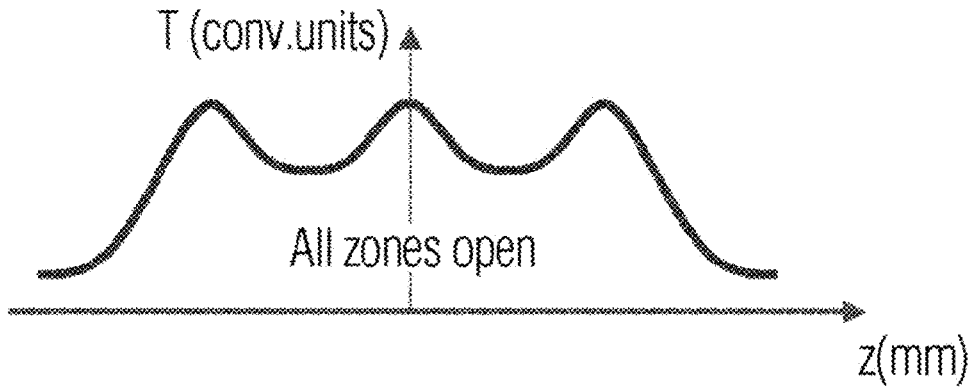
Figure 16C:
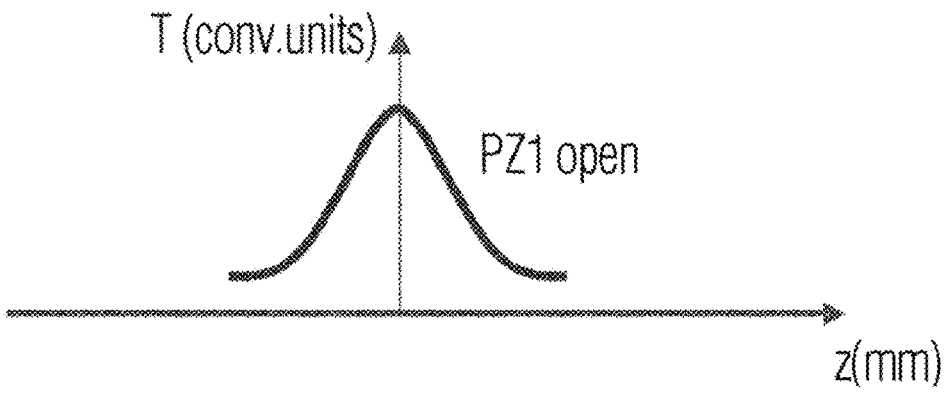
Figure 16D:
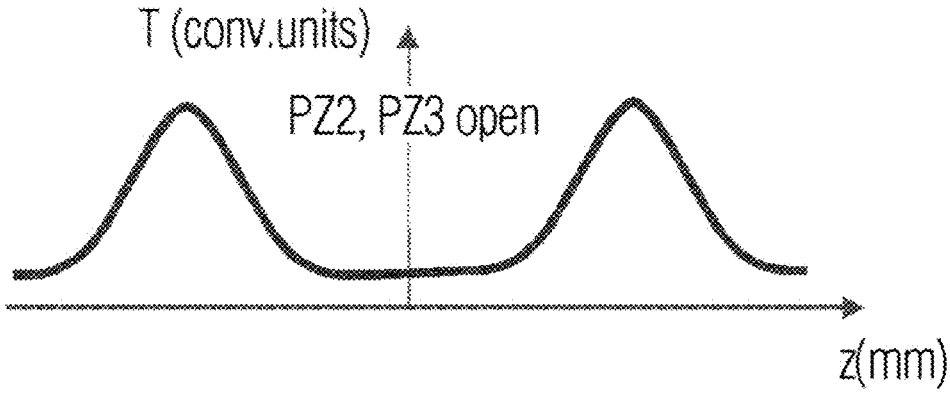
Figure 18:
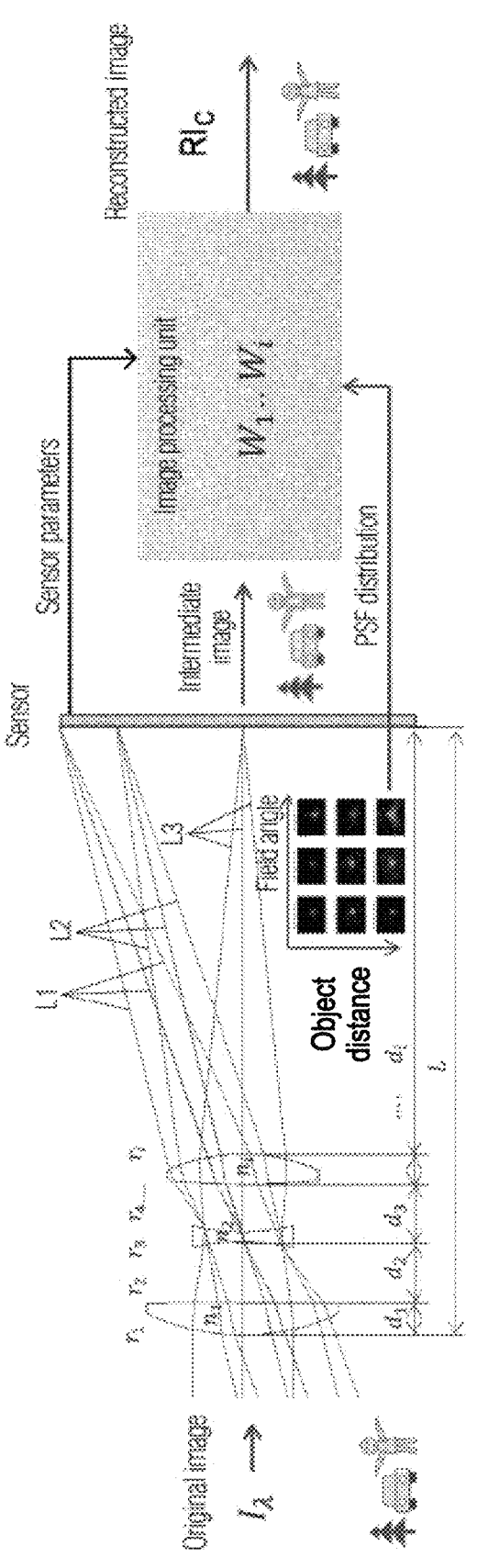
Figure 19A:
Figure 19B:
Figure 20A:
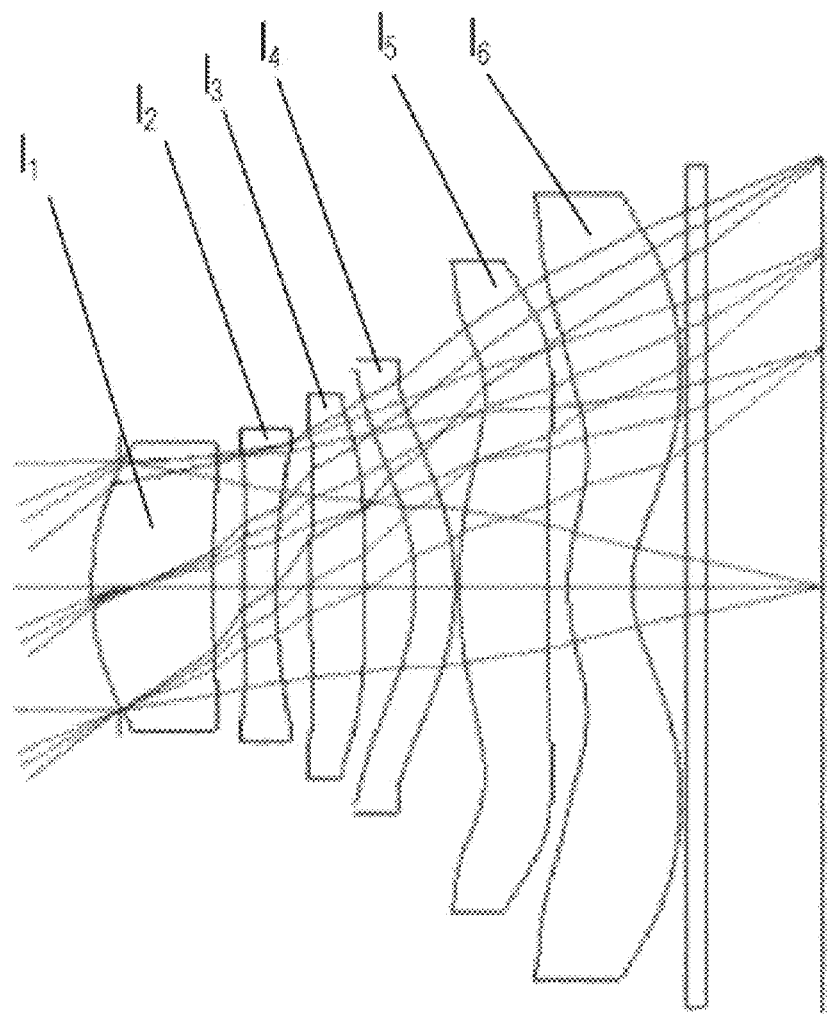
Figure 20B:
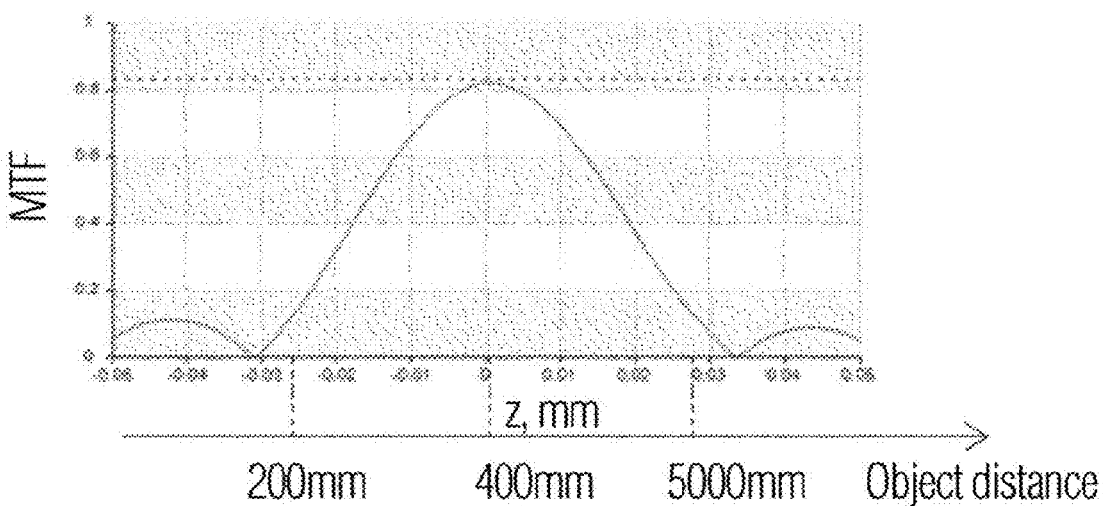
Figure 20C:
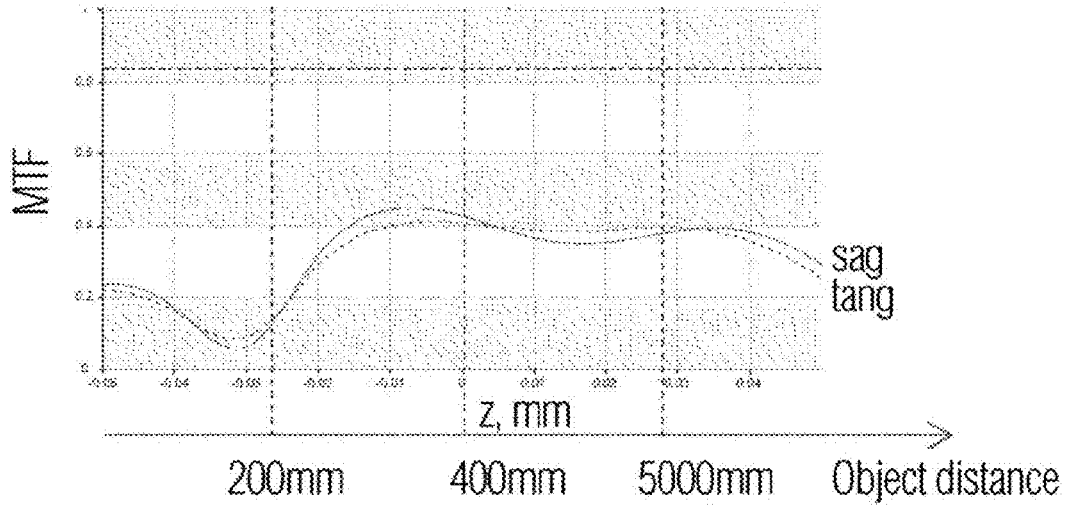
Figure 21:
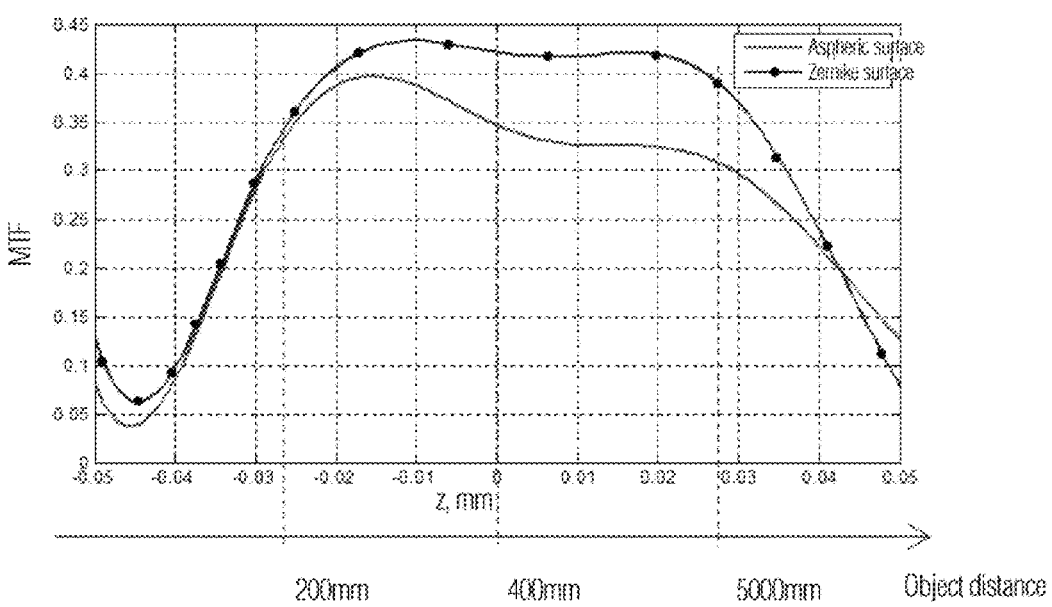
Figure 22A:
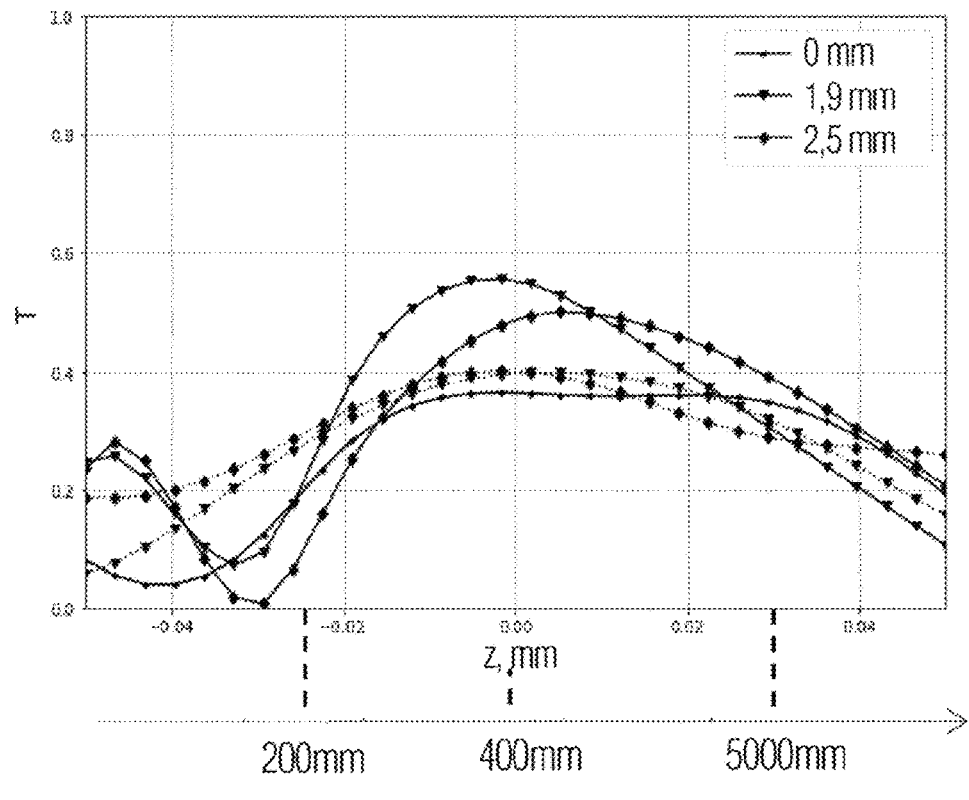
Figure 22B:
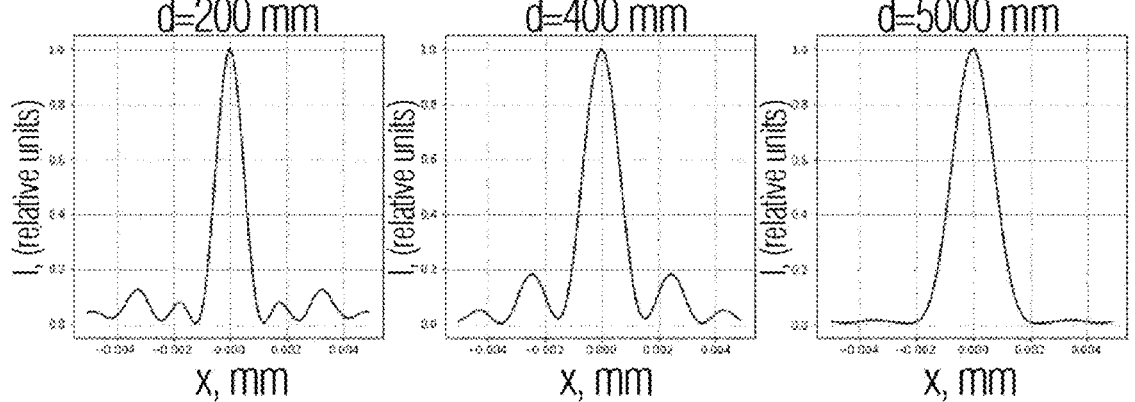
Figure 22C:
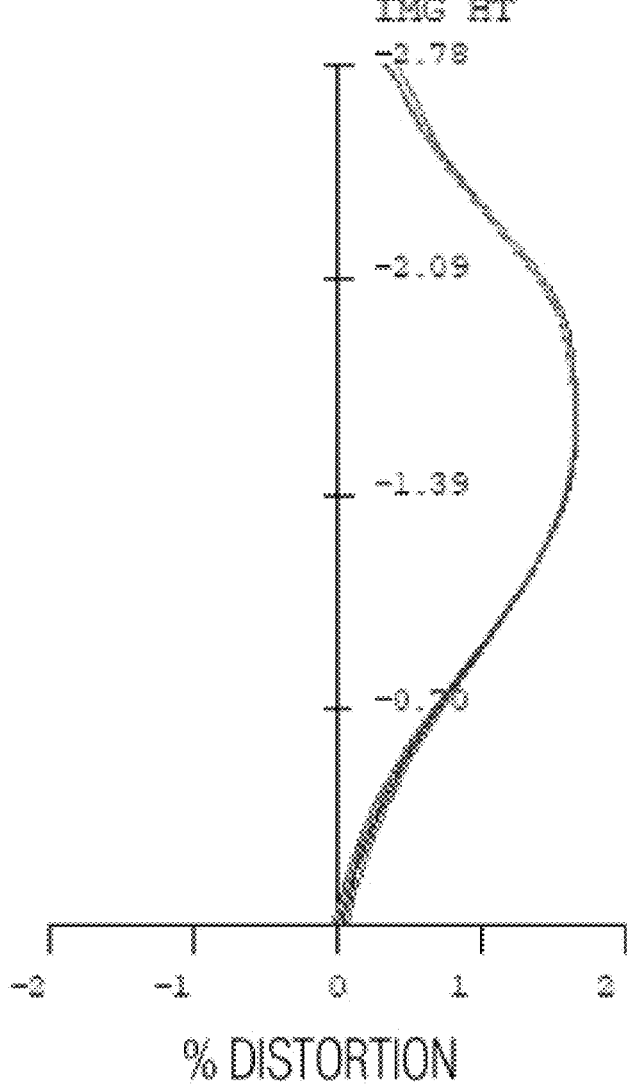
Figure 23A:
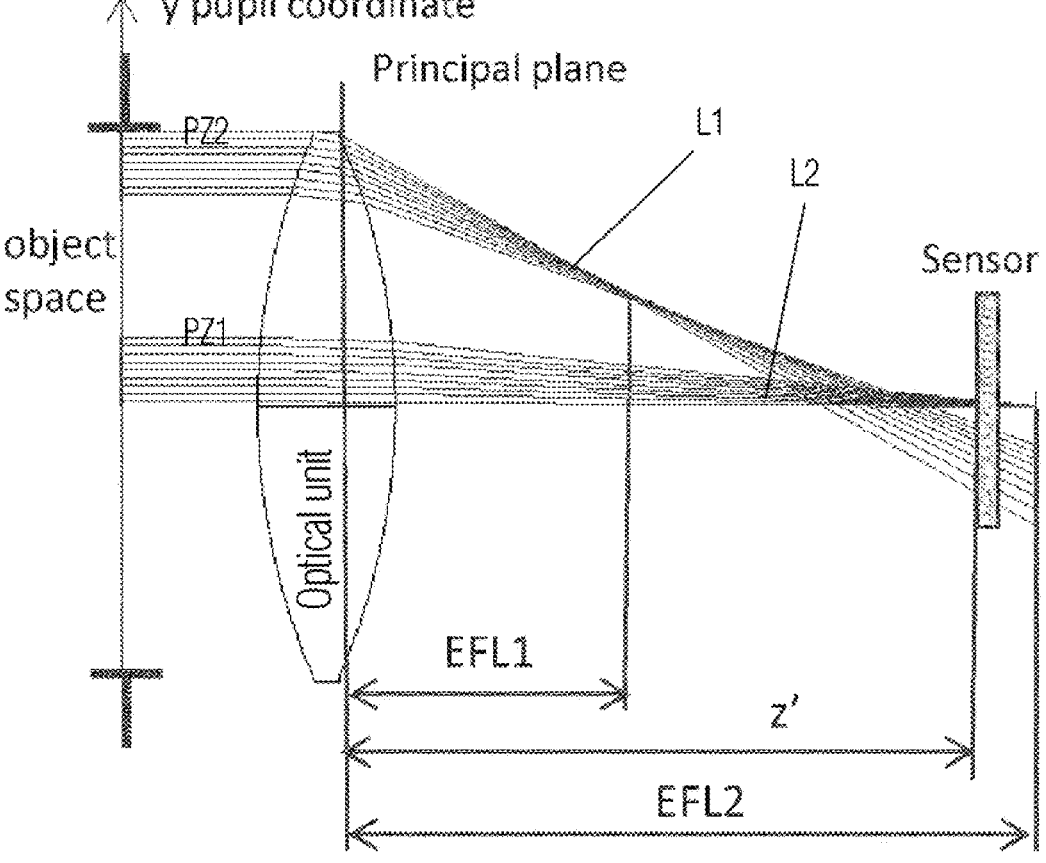
Figure 23B:
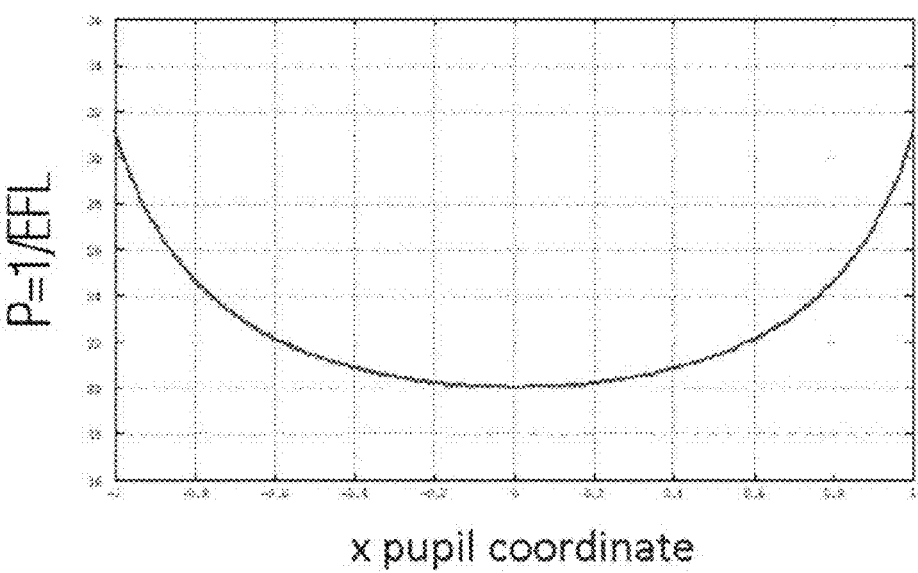
Figure 23C:
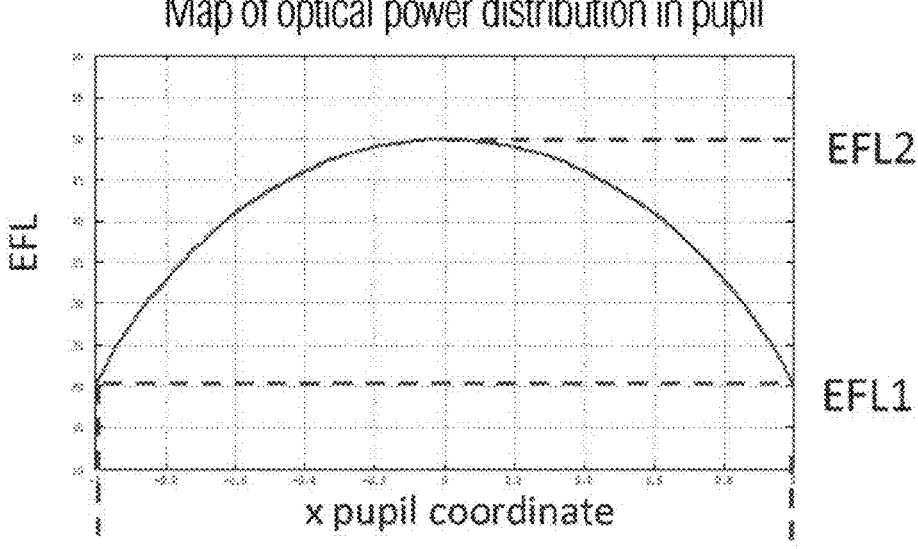
Figure 24A:
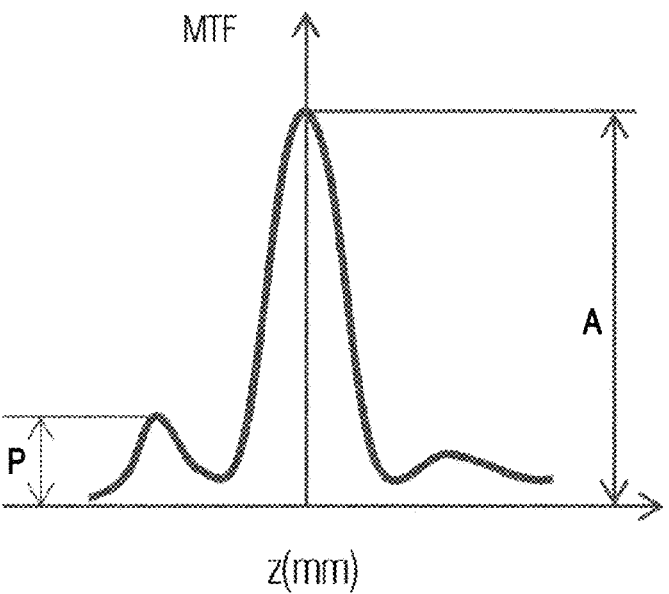
Figure 24B:
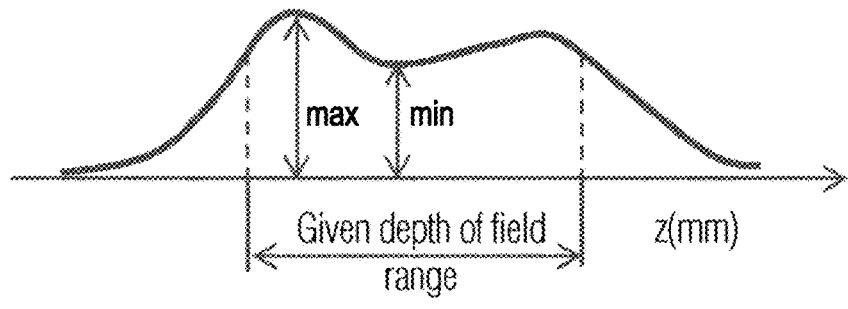
Figures 25A, 25B, 25C, 25D, 25E:
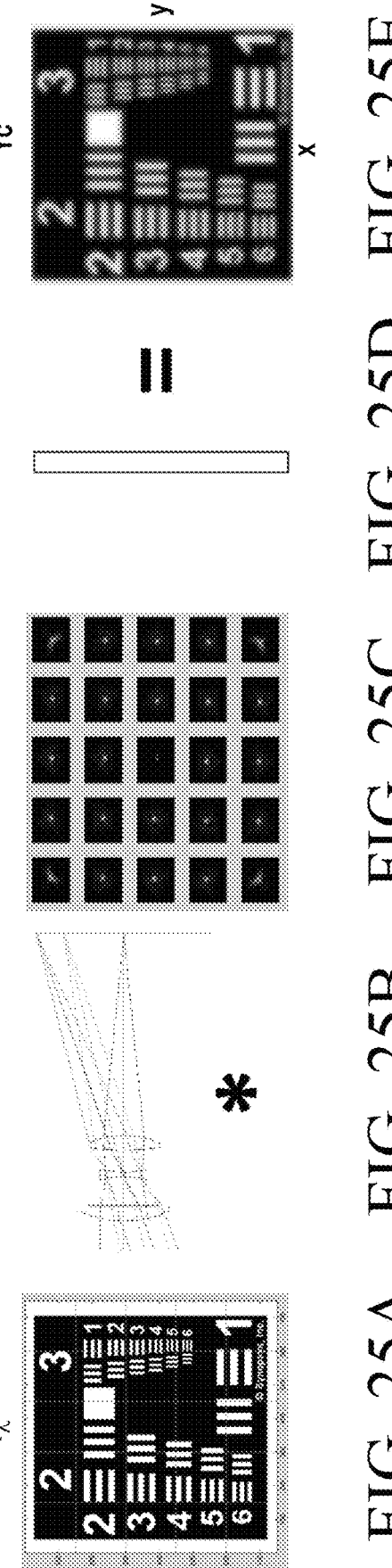
Figure 26:
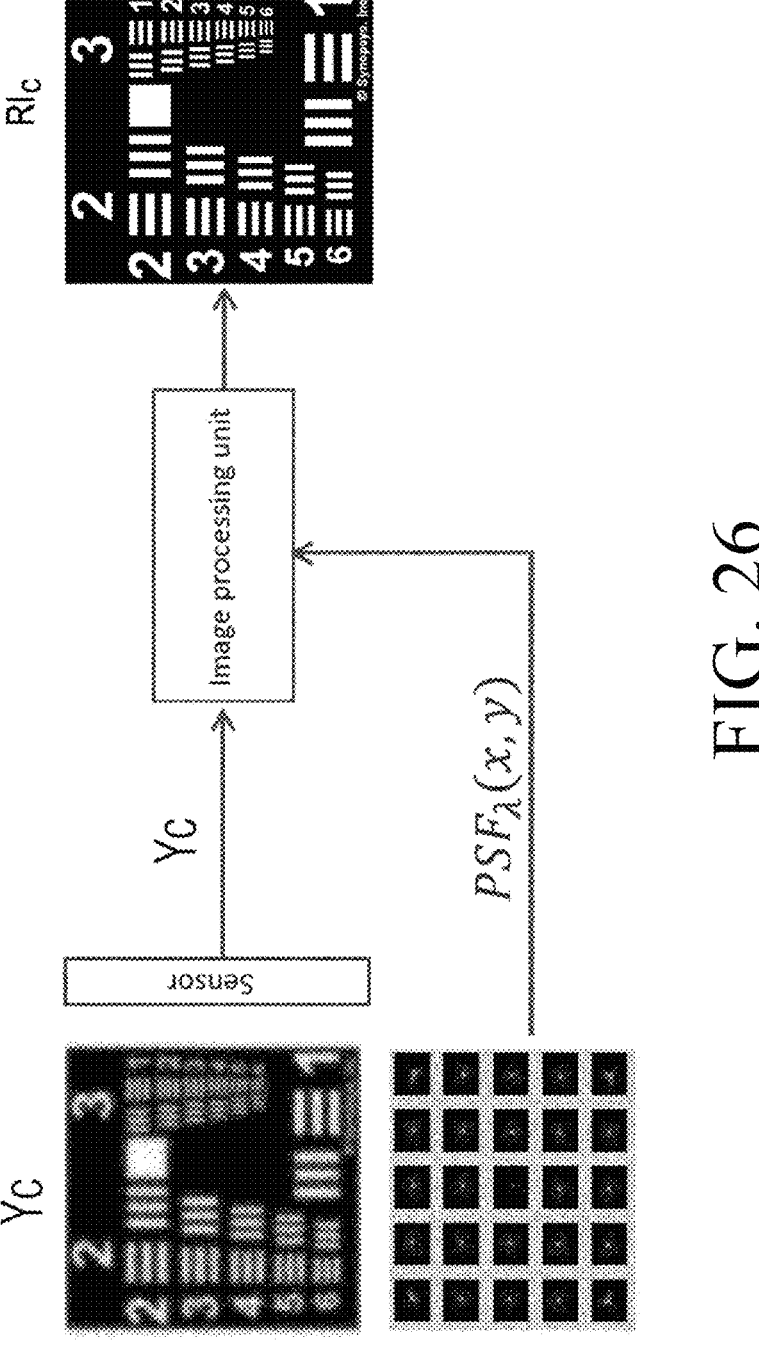
Figure 27:
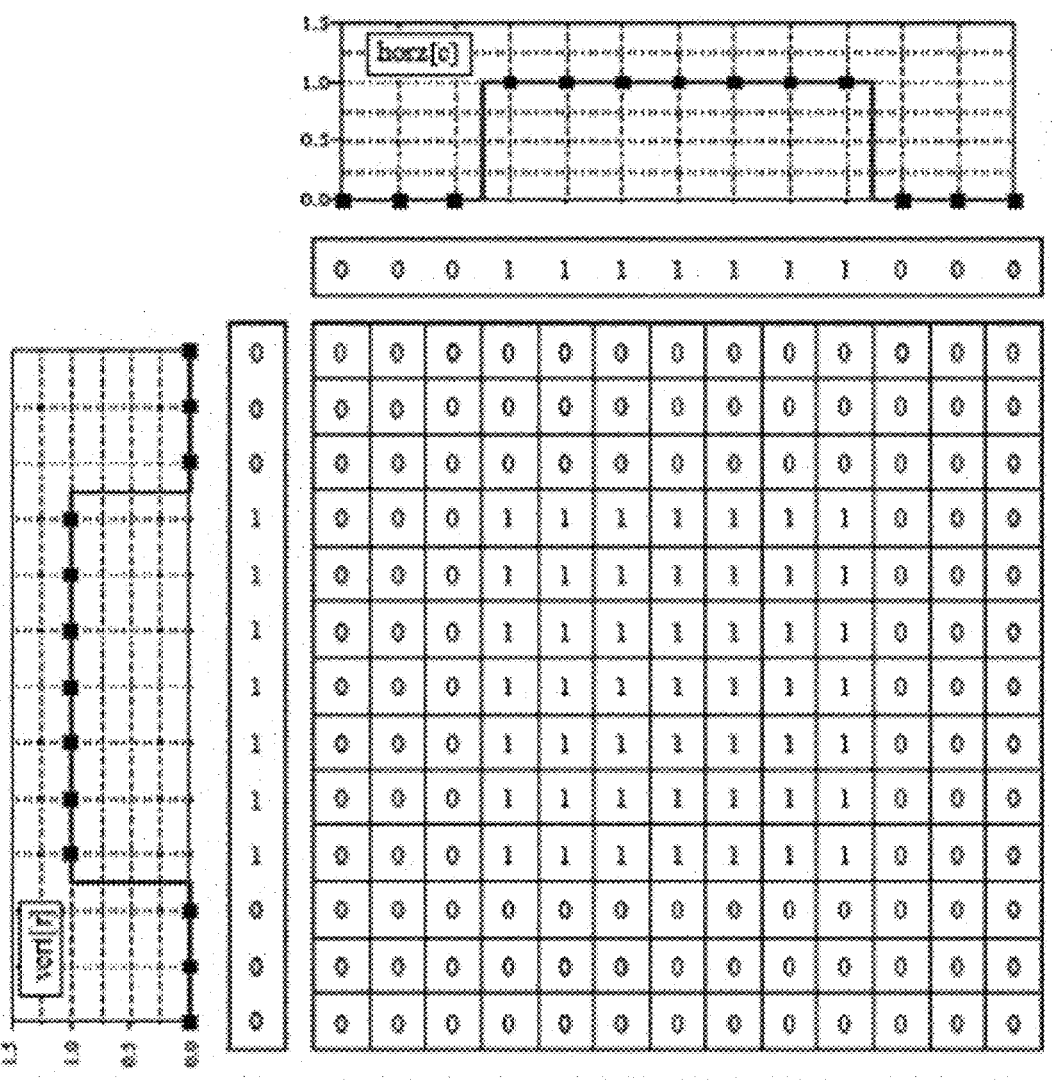
Figure 28:
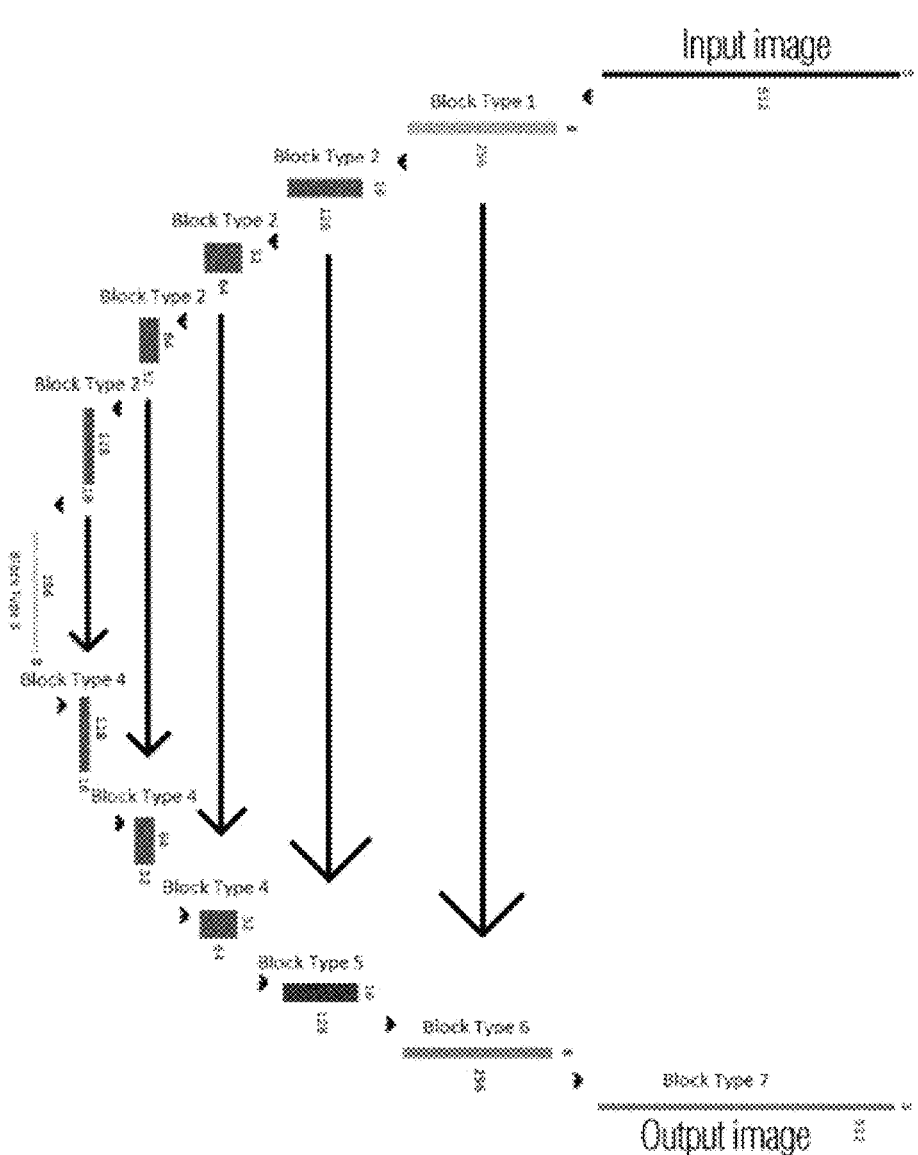

FIG. 4 is a schematic view of a device for extended depth of field imaging and intermediate blurred image formed by the device and output sharp image according to an embodiment of the disclosure;

FIG. 5A shows a scene at the instant of capturing an image with a smartphone with EDoF according to an embodiment of the disclosure;

FIG. 5B shows a process of forming an image without image processing according to an embodiment of the disclosure;

FIG. 5C shows an intermediate blurred image formed according to an embodiment of the disclosure;

FIG. 6A is a plot of point spread function (PSF) for an autofocus device in an out-of-focus position according to an embodiment of the disclosure;

FIG. 6B is a plot of point spread function (PSF) for an EDOF device according to an embodiment of the disclosure;

FIG. 6C is a plot of point spread function (PSF) of a device for extended depth of field imaging according to an embodiment of the disclosure;

FIG. 7 shows PSF function plots for a device for extended depth of field imaging as a function of field angle (W) and object distance (d) according to an embodiment of the disclosure;

FIG. 8 is a schematic diagram of forming an intermediate blurred image at sensor of a device for extended depth of field imaging and forming an output sharp image upon reconstruction by an image processing unit according to an embodiment of the disclosure;

FIG. 9A is a schematic diagram of forming intermediate image by a device for extended depth of field imaging, having at least two pupil zones according to an embodiment of the disclosure;

FIG. 9B illustrate plots of a modulation transfer function, showing modulation transfer coefficient (T) versus defocusing (z) for a device for extended depth of field imaging with two, three and multiple pupil zones according to an embodiment of the disclosure;

FIG. 10 is a schematic diagram of forming an intermediate image by a device for extended depth of field imaging, having at least two pupil subzones according to an embodiment of the disclosure;

FIG. 11A is a schematic diagram of forming two beams with respective foci F1, F2 for a device for extended depth of field imaging, having two pupil zones according to an embodiment of the disclosure;

FIG. 11B is enlarged view of the path of beams in the area of foci F1, F2 from the diagram of FIG. 11A, according to an embodiment of the disclosure;

FIG. 11C is a plot of modulation transfer function (MTF), showing modulation transfer coefficient (T) versus defocusing (z) according to an embodiment of the disclosure;

FIG. 12A shows a path of light beams for an imaging scheme with two foci according to an embodiment of the disclosure;

FIG. 12B shows a path of beams for an imaging scheme with three foci, according to an embodiment of the disclosure;

FIG. 12C is a plot illustrating modulation transfer function (MTF), showing modulation transfer coefficient (T) versus defocusing (z) for the imaging scheme with two foci according to FIG. 12A according to an embodiment of the disclosure;

FIG. 12D is a plot illustrating modulation transfer function (MTF) showing modulation transfer coefficient (T)

versus defocusing (z) for the three-focus imaging scheme according to FIG. 12B according to an embodiment of the disclosure;

FIG. 13 is a schematic view of an optical unit of a device for extended depth of field imaging with a pupil zone divided into at least two zones, where point spread function (PSF) does not depend on object distances; reference numeral 13a stands for point spread functions (PSF) for far position, central position and near position, and reference numeral 13b stands for point spread functions (PSF) as a function of field angle according to an embodiment of the disclosure;

FIG. 14 is a schematic view of an optical unit of a device for extended depth of field imaging with a pupil zone divided into at least two zones, where point spread function (PSF) depends on depth of field; reference numeral 14a stands for point spread functions (PSF) as a function of depth of field for far position, central position and near position, and reference numeral 14b stands for point spread functions (PSF) as a function of field angle according to an embodiment of the disclosure;

FIG. 15A is a schematic view of spots in the image plane in accordance with point spread function (PSF) for the device for extended depth of field imaging according to FIG. 13 according to an embodiment of the disclosure;

FIG. 15B is a schematic view of spots in the image plane in accordance point spread function (PSF) for the device for extended depth of field imaging according to FIG. 14 according to an embodiment of the disclosure;

FIG. 15C is a plot illustrating modulation transfer function (MTF), showing modulation transfer coefficient (T) versus defocusing (z) according to an embodiment of the disclosure;

FIG. 16A is a schematic view of a device for extended depth of field imaging with a shutter without an image processing device according to an embodiment of the disclosure;

FIGS. 16B, 16C and 16D show plots illustrating modulation transfer functions (MTF) which define modulation transfer coefficient (T) versus defocusing (z) as a function of opening pupil zones, according to various embodiment of the disclosure;

FIGS. 17A, 17B, 17C and 17D show optical power distribution maps as a function of pupil zone shape according to various embodiments of the disclosure;

FIG. 18 is a schematic view of a device for extended depth of field imaging, and an intermediate image and an output image formed by it according to an embodiment of the disclosure;

FIGS. 19A and 19B show images produced by present device for extended depth of field imaging before and after processing by imaging device according to various embodiments of the disclosure;

FIG. 20A is an embodiment of optical unit of a device for extended depth of field imaging according to an embodiment of the disclosure;

FIG. 20B is a plot illustrating modulation transfer function (MTF), showing modulation transfer coefficient (T) versus defocusing (z) in a system according to an embodiment of the disclosure;

FIG. 20C is a plot illustrating modulation transfer function (MTF), showing modulation transfer coefficient (T) versus defocusing (z) in a device for extended depth of field imaging according to an embodiment of the disclosure;

FIG. 21 shows plots illustrating modulation transfer functions (MTF), showing modulation transfer coefficient (T) versus defocusing (z) for an optical unit having an aspheric surface and/or a Zernike surface for extended depth of field imaging according to an embodiment of the disclosure;

FIG. 22A shows plots of modulation transfer function MTF for an optical unit of an imaging device according to an embodiment of the disclosure;

FIG. 22B shows plots of point spread functions (PSF) for an optical unit of the imaging device as a function of object distance (d) according to an embodiment of the disclosure;

FIG. 22C shows plots illustrating distortion of an optical unit of a device for extended depth of field imaging according to an embodiment of the disclosure;

Figure 23D:
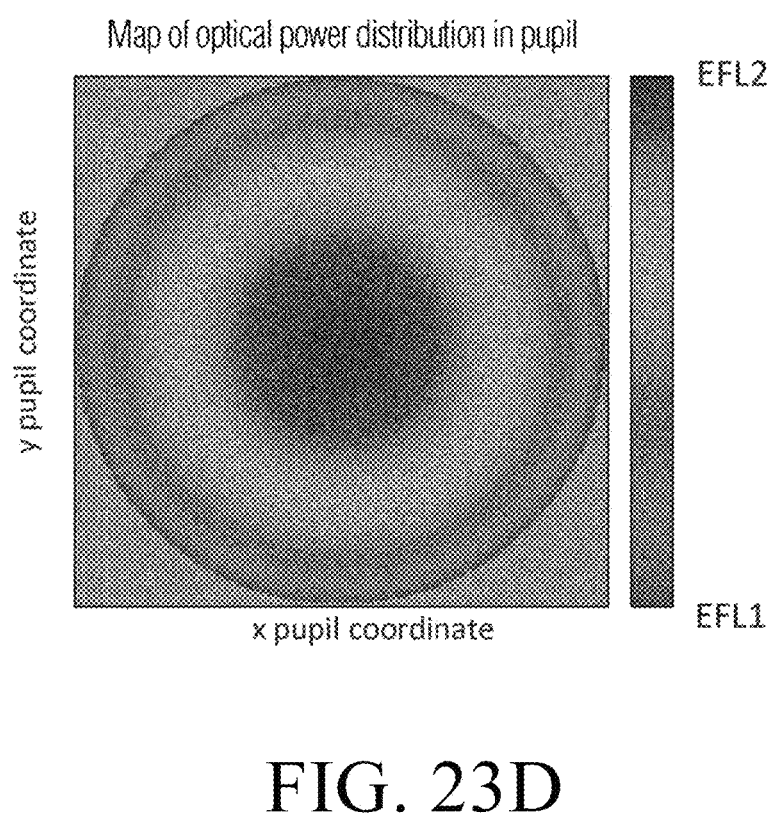

FIG. 23A is a schematic view of an optical unit with input pupil divided into two pupil zones (PZ1, PZ2) and a sensor for extended depth of field imaging according to an embodiment of the disclosure;

FIG. 23B shows an optical power distribution profile of an optical unit in sagittal section of a pupil according to FIG. 23A of a device for extended depth of field imaging according to an embodiment of the disclosure;

FIG. 23C shows a focal length distribution profile of an optical unit in sagittal section of a pupil according to FIG. 23A of a device for extended depth of field imaging according to an embodiment of the disclosure;

FIG. 23D is a focal length distribution map of an optical unit according to FIG. 23A of a device for extended depth of field imaging according to an embodiment of the disclosure;

FIG. 24A is a plot of point spread function (PSF) with minimized side lobes of an optical unit of a device for extended depth of field imaging according to an embodiment of the disclosure;

FIG. 24B is a plot of modulation transfer function (MTF) as a function of defocusing (depth of field), illustrating smooth curve of MTF function according to an embodiment of the disclosure;

FIGS. 25A, 25B, 25C, 25D, and 25E, illustrate a process of forming an image by the optical unit and registering at the sensor, according to various embodiments of the disclosure;

FIG. 26 is a schematic view of an image of an object (Y_C) formed at a sensor (see resulting intermediate image in FIG. 25D) and reconstructed image obtained after processing in the image processing unit according to an embodiment of the disclosure;

FIG. 27 is a schematic view of separable point spread function (PSF) according to an embodiment of the disclosure; and FIG. 28 is a schematic view of seven-level neural network architecture according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

Figure 1A:
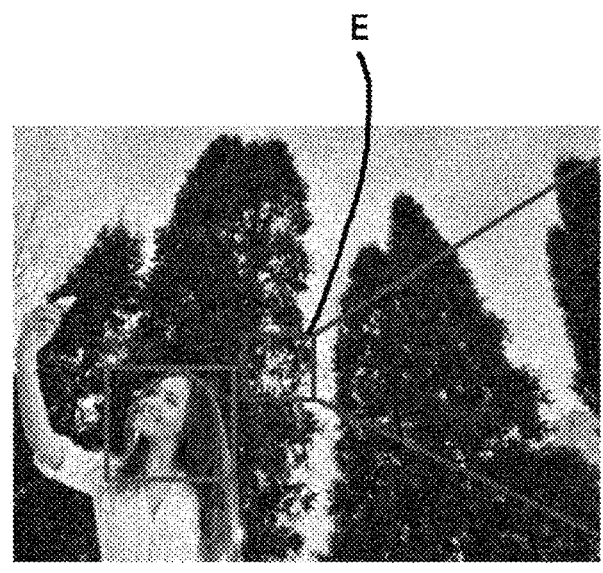
FIG. 1A is a schematic view of an image of a scene including a target object and a background, produced by methods according to an embodiment of the disclosure.
Figure 1B:
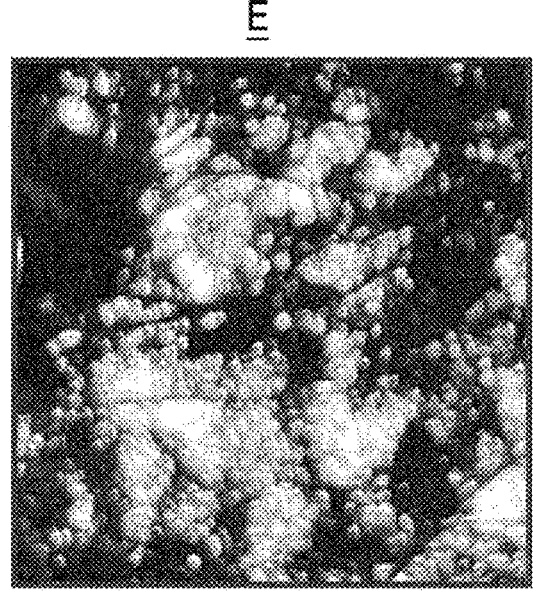
FIG. 1B is a schematic enlarged view of background 'E' of image of a scene in FIG. 1A, produced by methods according to an embodiment of the disclosure.

FIGS. 1A and 1B show examples of an unnatural background view, where FIG. 1A on the left shows a sharp image of a girl's face in focus, and an image of a tree in a background, where an unnaturally blurred background is observed in the box according to an embodiment of the disclosure.

FIG. 1B is enlarged view of the background 'E' blurred image in which spaces between leaves and branches of a tree, far from a camera, are shown with halos according to an embodiment of the disclosure.

Referring to FIGS. 1A and 1B, extended depth of field (EDoF) systems in the related art generally have expensive designs since the extended depth of field function requires additional optical elements or coating such as phase masks, phase plates, coded-aperture masks that introduce phase delay to make contrast uniform across the required image depth. Low contrast image is registered by the sensor and then image processing is fulfilled to increase contrast and improve image quality. At the same time, the provision of phase masks, for example, fourth-degree parabola mask, cubic polynomial shape mask, Toraldo mask, or coded aperture in EDOF systems, significantly increases cost or impairs their light and energy characteristics.

Figure 2A:
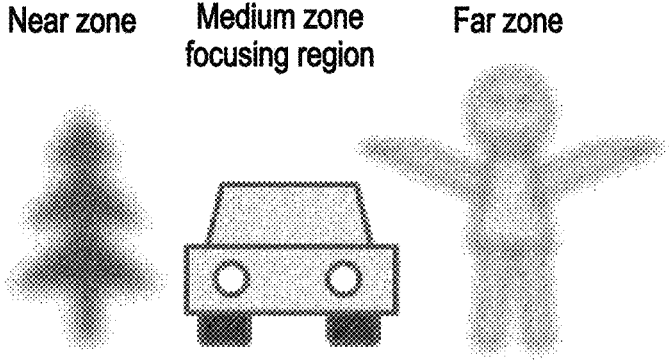
FIG. 2A is a schematic view of a scene image formed by a lens according to an embodiment of the disclosure.
Figure 2B:
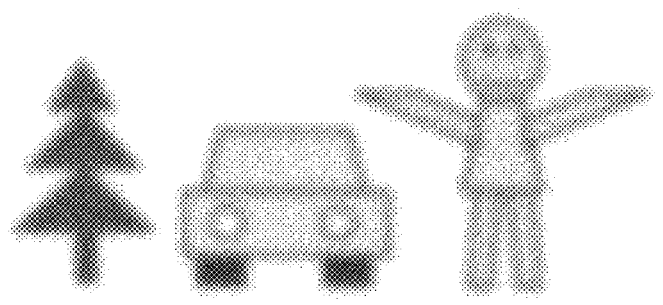
FIG. 2B is a schematic view of a scene image produced using a lens with extended depth of field (EDoF) according to an embodiment of the disclosure.
Figure 2C:
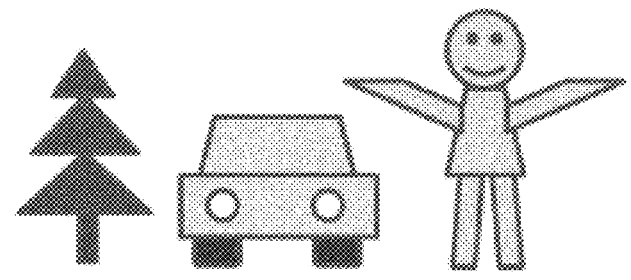
FIG. 2C is a schematic view of a scene image after image processing process, produced by an EDoF lens according to FIG. 2B according to an embodiment of the disclosure.

FIGS. 2A, 2B, 2C show schematically scene images with target objects located at different distances to a smartphone camera (near zone, medium zone which is focus zone, far zone) formed by imaging systems according to various embodiments of the disclosure.

Furthermore, FIG. 2A is a scene image captured with a conventional lens, where objects, such as a Christmas tree and a person, are blurred because they are out of focus, while a car object, being in focus of a smartphone camera, is sharp.

FIG. 2B is a scene image produced with an extended depth of field (EDoF) lens that uses a phase mask. Here, all objects in a scene are nearly similarly blurred, including a car according to an embodiment of the disclosure.

FIG. 2C is a scene image after image processing provided by an EDoF lens according to FIG. 2B with a phase mask in an optical scheme according to an embodiment of the disclosure.

Here, in FIG. 2C, all objects in the scene, i.e. a tree, a car, and a person, are equally sharp.

Figure 2D:
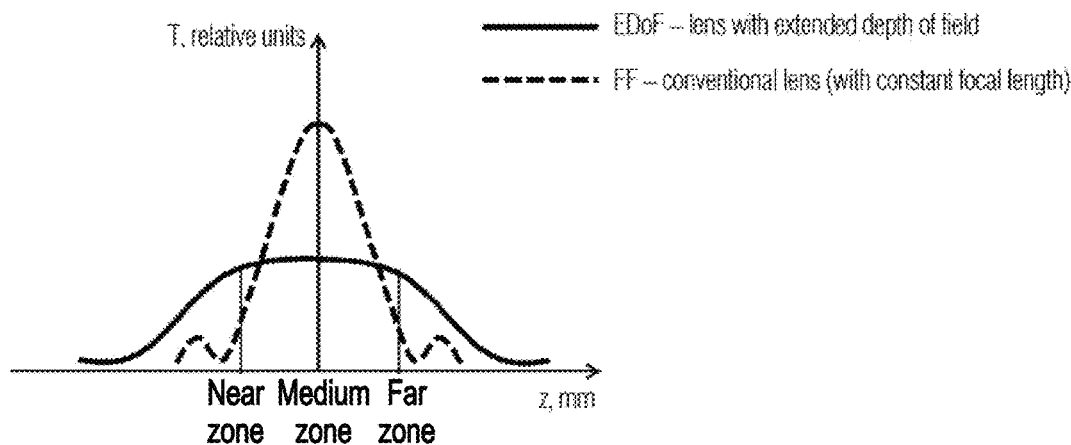
FIG. 2D shows plots of modulation transfer function, illustrating modulation transfer coefficient (T) of an image as a function of defocusing (z) value for a lens and an EDoF lens according to an embodiment of the disclosure.

FIG. 2D shows plots illustrating amount of modulation transfer coefficient (T) or image sharpness versus amount of defocusing (z) for a lens and an EDoF lens according to an embodiment of the disclosure.

Referring to FIGS. 2A to 2D, a curve illustrating modulation transfer coefficient versus defocusing for a lens has a sharp peak in the focus area on target object of the scene, as clearly illustrated in FIG. 2A, and a curve illustrating modulation transfer coefficient versus defocusing for an EDoF lens has a uniform, smooth character in the required range of defocusing (z), which corresponds to blurred image of all scene objects (in FIG. 2B) within the required depth.

Figure 3A:
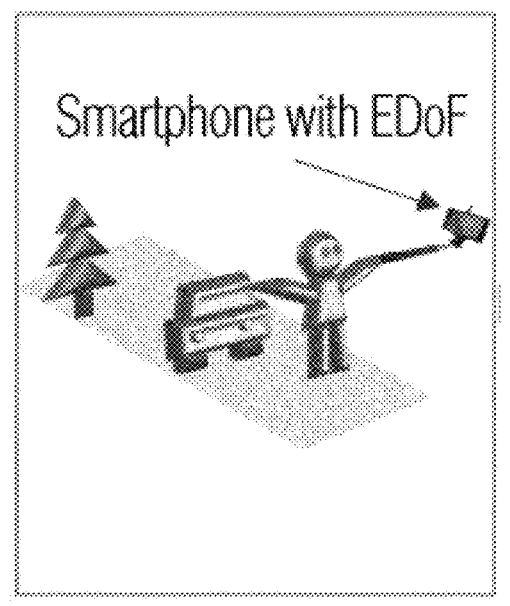
FIGS. 3A, 3B and 3C are general diagrams of the disclosure, where
Figure 3B:
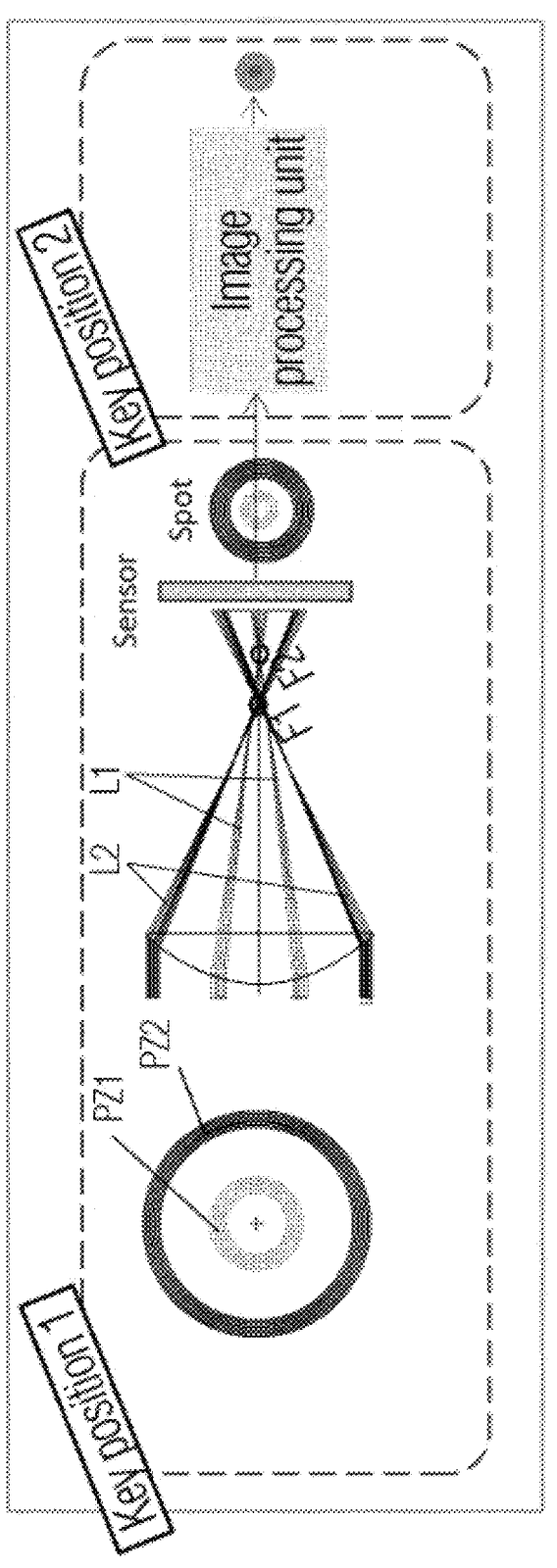
Figure 3C:
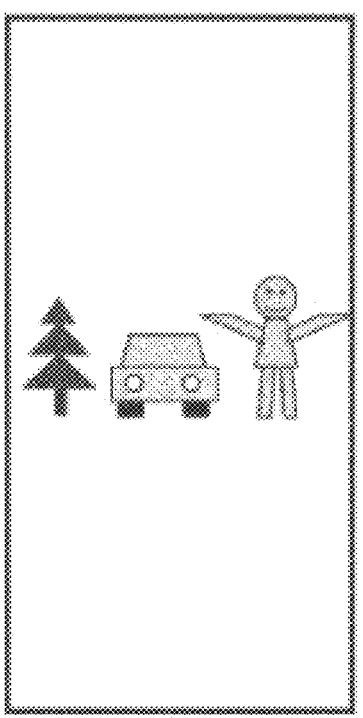

FIGS. 3A to 3C are general views of the disclosure (see FIG. 3B) showing a scene at an instant of capturing image with smartphone (see FIG. 3A) and a scene image after processing a captured image (see FIG. 3C) according to various embodiments of the disclosure.

Basic solutions according to the disclosure (Key Position 1 and Key Position 2).

Referring to FIG. 3B, an optical imaging device has multiple pupil zones (PZ1, PZ2).

Each zone is defined by own focus (F1, F2) and aberration properties.

Each focus corresponds to some distance (depth) in object space. Moreover, each pupil zone corresponds to light beam L1, L2, for example, pupil zone PZ1 corresponds to light beam L1 and focus F1.

Aberration properties define image quality according to image quality criteria for a range of distances.

Sensor registers images from different distances simultaneously. Images at the sensor contain information on objects at different distances. Furthermore, images captured by the sensor are blurred because objects at different distances may be out of focus and overlap each other. To compensate for blurring, a function is provided for processing captured images by an image processing unit (Key Position 2), which is configured to reconstruct images at desired distance (depth) using information about optical device characteristics (modulation transfer function (MTF) or point spread function depending on distance). As a result of image processing, sharp image of objects over the entire field of the scene is displayed on smartphone screen (see FIG. 3C).

Hereinafter, embodiments of the disclosure will be described in detail. The embodiments are illustrated in the accompanying drawings, where the same or similar reference numerals refer to the same or similar elements or elements having the same or similar functions. The embodiments described with reference to the accompanying drawings are illustrative and used only to explain the disclosure, and should not be construed in any way as imposing limitations upon the scope thereof.

In the context of the disclosure, the following concepts and terms shall have the following meanings assigned to them by the inventors:

Target object is an object selected by user to capture.

Aperture diaphragm is a diaphragm that limits the beam emerging from axial point of an object.

Pupil is a paraxial image of aperture diaphragm.

Pupil zone (PZ) is a selected area of pupil with own optical device properties (focal length, aberration properties).

Field of view is the angle between two light beams passing through the center of the lens entrance pupil towards displayed object points that are most distant from the optical axis in object space.

Field angle is the angle between the optical axis and the light beam passing through a point of the object in the field of view.

Spot is an image of a point, formed by real optical system.

Intermediate image is an image formed by optical unit on sensor.

Reconstructed image is an image at output of image processing unit.

Point spread function (PSF) describes distribution of illumination of a point object image as a function of coordinates in the image plane.

Bokeh effect is a blur of an out-of-focus part of image, usually background.

Halo is a light border around image of points of an object.

Modulation transfer coefficient is the ratio of contrast of image of a harmonic (sinusoidal) object to contrast of the object itself.

Modulation transfer function (MTF) shows the variation in modulation transfer coefficient (contrast) of the image as a function of spatial frequency of a harmonic object. In other words, MTF defines how accurately spatial and frequency content of the object is transferred to the image.

Defocusing is a displacement of analysis plane relative to mounting plane of the sensor.

Optical system (unit) is a set of optical elements specifically arranged in space to provide required formation of light beams (without sensor and processing unit).

FIG. 4 is a schematic view of a device for extended depth of field imaging and intermediate blurred image formed by a device and an output sharp image according to an embodiment of the disclosure.

FIGS. 5A, 5B and 5C shows schematically a process of forming an image by a device for extended depth of field imaging without image processing first according to various embodiments of the disclosure.

Referring to FIG. 4 and FIGS. 5A to 5C, according to a first embodiment, there is provided a device for extended depth of field imaging (see FIG. 4), comprising an optical unit (e.g., optical device), a sensor and an image processing unit. FIGS. 5A to 5C shows a schematic view of a device for extended depth of field imaging without an image processing unit. Here, the optical unit has at least two pupil zones (PZ1, PZ2) (see FIGS. 3B, 4 and 5B). Furthermore, each pupil zone with respective aberration properties operates with appropriate range of object distances (d1, d2, d3), which corresponds to its focus (F1, F2, F3) and range of field angles (angle 1, angle 2, angle 3). Aberration properties (e.g. wavefront aberrations (OPD)) of each pupil zone determine image quality in accordance with optical unit characteristics for distance range d1, d2, d3, . . . , dN. The characteristics include, for example, point spread function (PSF) or modulation transfer function (MTF) for the range of object distances and field angles. The optical unit forms an inter-mediate blurred image, which is then corrected by the image processing unit using the optical device characteristics (PSF or MTF functions) in the range of object distances and field angles, and the image processing unit outputs a sharp contrast image of objects over the entire field of view.

Characteristics and properties of pupil zones are jointly optimized so that the optical unit forms point spread function (PSF) with minimized side lobes (side peaks) for out-of-focus points.

Further, FIGS. 6A to 6C show plots of point spread function (PSF). FIG. 6A shows a plot of point spread function (PSF) when a conventional camera optical system is defocused; as a result, images of background point objects look like ring or half-ring spots, this leading to unnatural blur of the background (donut-shaped bokeh) according to various embodiments of the disclosure.

FIG. 6B is a plot of defocused point spread function (PSF) for a conventional EDOF system, which shows side peaks (side lobes), as a result, images of background point objects look like spots with a ring halo, this leading to unnatural blur of the background (donut-shaped bokeh) according to an embodiment of the disclosure.

FIG. 6C is a plot of point spread function (PSF) of an imaging system according to the disclosure, where PSF function in out-of-focus position has no side lobes or has extremely minimized side lobes, this leading to uniform blurring of the background according to an embodiment of the disclosure.

This effect is provided by the use of a multifocal optical unit with multiple pupil zones. As a result, the image processing unit outputs final object image with natural background blur (bokeh effect).

It should be noted that conventional EDOF systems operate in the following manner:

1) an optical unit registers a blurred image. The image is deliberately made blurred (using amplitude-phase masks or introducing spherical aberration) to increase depth of field. In such systems, point spread function is formed with side peaks (side lobes). Side peaks give rise to a ring or semi-ring halo appearing in the point image. This is especially critical for far objects having many point sources, for example, spaces between leaves and branches of trees (see FIGS. 1A and 1B). From a distance, they appear to be points, but EDoF registers them as a haloed spot due to side peaks in point spread function;

2) the blurred image formed by the optical unit is registered by the sensor;

3) a processing unit reconstructs sharp image from the blurred image. If the image has blurred haloed points (spots), after processing they will be converted into sharp points with sharp halo. Therefore, the image is distorted: instead of a supposed point, there is obtained a point with sharp ring.

In the optical unit of the present imaging device, blur is formed not by a phase mask or introduction of spherical aberration, but by dividing the pupil into zones with own aberration properties, although the use of a mask is not excluded. As a result, the optical unit forms a blurred image and additionally, unlike other conventional EDoFs, point spread function (PSF) has no side peaks. Point object (or point on object, point source) is converted to a blurred point (spot), but without halos.

Furthermore, the image processing unit is configured to process the intermediate blurred image (see FIGS. 4 and 5B) and reconstruct the blurred image formed by the optical unit. Image processing is performed based on distribution of PSF or MTF function over the given range of object distances and field angles. Image reconstruction is also performed based on parameters of the imaging device sensor, which include: spectral sensitivity, noise, sampling parameters, and which are used in the image reconstruction process. Thus, the processing unit reconstructs blurred image into a sharp one. Since there are no halos in the image, the blurred point image (spot) turns into a point, as it should be in naturally looking image.

FIG. 7 shows plots that illustrate examples of variation in the point spread function shape as a function of field angle and object distance according to an embodiment of the disclosure.

There is clearly demonstrated how the point spread function (PSF) depends on field angle (w) and object distance (d). Plots in FIG. 7 (where x is the coordinate in the image plane, I is the point spread function value) show examples of point spread function for (target) object distance of 400 mm, 1000 mm, 5000 mm and field angles (w) of 0 degrees, 23 degrees and 40 degrees. Information obtained in experimental studies carried out by the inventors, some of which are presented in FIG. 7 as a non-limiting example, is then used in the image processing unit to reconstruct blurred image.

It should be noted that the experiments demonstrated that at each of the distances of 400 mm, 1000 m and 5000 mm to the object, the imaging device according to the disclosure forms point spread function with minimized side lobes, this indicating that a uniformly blurred intermediate image is formed, which in turn ensures reconstruction of sharp image after processing in the image processing unit.

In addition, the experiments showed that at field angles of −40 degrees, 0 degrees, 23 and +40 degrees and at given object distances, the imaging device according to the disclosure forms point spread function with minimized side lobes, this indicating the formation of uniformly blurred intermediate image, which in turn ensures reconstruction of a sharp image after processing in the image processing unit.

Based on the conducted studies, it was found that the imaging device according to the disclosure provides the formation of point spread function, in which the minimized side peaks (side lobes) of the point spread function formed by the optical unit do not exceed 10% of the central peak in the given range of object distances.

FIG. 8 is a schematic diagram of a process of forming a blurred image at the sensor, and the image data from the sensor is sent to the image processing unit where the image is reconstructed according to an embodiment of the disclosure.

Here, image processing is performed based on the point spread function (PSF) distribution, as shown in FIG. 7 over the given range of object distances and field angles. Image reconstruction is also accomplished taking into account parameters of the imaging device sensor, which include: spectral sensitivity, noise, sampling parameters, and which are used in the image reconstruction process.

FIG. 9A is a schematic diagram of forming intermediate image by a device for extended depth of field imaging, having at least two pupil zones according to an embodiment of the disclosure.

It should be noted that the sensor is a matrix photodetector, in particular a CMOS matrix photodetector or a CCD sensor, which is capable of detecting electromagnetic radiation in the range of 0.4-0.7 μm, and the pixel size of the sensor is 0.7 μm, 1 μm, and 1.5 μm. In another embodiment, an imaging device having at least two pupil zones is provided, as shown in FIG. 9A.

Furthermore, each pupil zone functions with respective range of object distances (d1, d2, dN) (not shown in FIG. 9A), which corresponds to own focus (F1, F2, FN) and the range of respective field angles.

Referring to FIG. 9A, each pupil zone corresponds to own beam, i.e. pupil zone PZ1 corresponds to light beam L1, etc., and to own spot area.

Moreover, wavefront aberrations (OPD) of each pupil zone determine image quality in accordance with point spread function (PSF) or modulation transfer function (MTF) for the range of object distances and field angles. Image processing is performed based on the dependence of PSF or MTF function on the range of object distances and field angles. Image reconstruction is also accomplished based on imaging device sensor parameters, which include: spectral sensitivity, noise, sampling parameters, and which are used in the image reconstruction process.

FIG. 9B shows plots of modulation transfer coefficient (T) versus defocusing (z) for a device with two, three, and multiple pupil zones, and corresponding number of foci. The term "multiple" in the focus context is conditional and provides for a range of foci, for example, from 3.1 mm to 2.9 mm, used in smartphone cameras according to an embodiment of the disclosure.

Plot for the imaging device with multiple pupil zones, i.e. when the pupil is divided into plurality of zones, represents a smoother dependence of modulation transfer coefficient (T) on defocusing (z), in contrast to the plots when the pupil is divided into two or three zones.

Thus, an optical imaging device with more than two or three pupil zones features a smoother modulation transfer function and a greater depth of field.

According to another embodiment of the imaging device, there is provided a design in which, in addition to dividing the pupil into two zones, each zone is divided into subzones (subzone 1, subzone 2, subzone 3 and subzone N), see FIG. 10.

FIG. 10 is a schematic diagram of forming an intermediate image by a device for extended depth of field imaging, having at least two pupil subzones according to an embodiment of the disclosure.

Each subzone has its own focus (F1 . . . . FN) and own light beam L1, L2, LN. Here, section 1 is a lens section, for example, meridional, and section 2 is sagittal, or vice versa. In an ordinary axisymmetric surface (for example, spherical), these sections have the same profile.

Referring to FIG. 10, profiles of section 1 and 2 are different, in this case asymmetric lens profile used in the imaging device according to FIG. 10 provides a greater depth of field and forms uniformly blurred intermediate image over the entire depth and field of the scene.

In this case, the optical unit generates an intermediate blurred image of the image, which is further corrected by the image processing unit based on point spread function (PSF) or modulation transfer function (MTF) for the range of object distances and field angles. Moreover, image reconstruction is also accomplished based on parameters of the imaging device sensor, which include: spectral sensitivity, noise, sampling parameters, and which are used in the image reconstruction process.

It should be noted that depending on the number of pupil zones, each having own focal length, own modulation transfer function (MTF) is formed for respective light beam (L1, L2, LN).

FIGS. 11A and 11B show schematic diagrams of forming two beams with respective foci F1, F2 for an imaging device with two pupil zones according to various embodiments of the disclosure.

FIG. 11A is a schematic diagram of forming two light beams converging into foci F1, F2. FIG. 11B is an enlarged view of the path of beams near the foci F1, F2 (i.e. in the area enclosed in oval in FIG. 11A).

The design with two pupil zones features a modulation transfer function (MTF) showing modulation transfer coefficient (T) versus defocusing (z) (see FIG. 11C), and having two peaks of the same height on the plot, which ensures formation of sharp image with the same modulation transfer coefficient at peak points.

FIGS. 12A and 12B show beam paths for designs with two and three foci, respectively according to various embodiments of the disclosure.

FIGS. 12C and 12D show the respective MTF functions as a function of the amount of defocusing (z) according to various embodiments of the disclosure.

With the optical design with two pupil zones, the optical imaging device forms images of different contrast depending on different depths (defocusing), see FIG. 12C, which clearly illustrates the presence of at least two peaks of different height.

Referring to FIG. 12D, MTF function for an optical imaging device with three or more foci, provided by dividing the pupil zone into multiple zones or subzones, thereby enabling formation of images at different object distances without focusing. In this respect, as clearly illustrated in FIG. 12D, the presence of multiple peaks in the MTF plot provides a more uniform character of the MTF function.

FIG. 13 is a schematic view of an optical unit of a device for extended depth of field imaging with a pupil zone divided into at least two zones, where point spread function (PSF) does not depend on object distances; reference numeral 13a stands for point spread functions (PSF) for far position, central position and near position, and reference numeral 13b stands for point spread functions (PSF) as a function of field angle according to an embodiment of the disclosure.

According to one embodiment of the imaging device (see FIG. 13) with the pupil zone divided into at least two zones, an optical unit is provided, illustrating the scheme of forming light beams L1, L2 with the respective foci, where point spread function PSF does not depend on object distances, i.e. depth of field. Each pupil zone (PZ1, PZ2, PZN) is defined by own focus (F1, F2) and aberration properties.

It should be noted that the concepts of depth of field and depth of focus both refer to the distance along the optical axis, within which the object plane and the image plane are allowed to move, respectively, provided that the image quality is still satisfactory, i.e. in our case, it can be reconstructed by the processing unit.

Moreover, each pupil zone corresponds to respective light beam L1, L2, for example, pupil zone PZ1 corresponds to light beam L1 and focus F1.

Invariance of the optical unit according to FIG. 13 is illustrated in point spread function plots for far position, central position and near position, which have approximately the same shape of PSF function (see plots '13a' in FIG. 13) regardless of object distances, where PSF2, PSF0, PSF3 are PSF functions for far position, central position and near position, respectively.

Thus, point spread functions are invariant (PSF0~PSF2~PSF3) regardless of the object distance.

At the same time, as clearly seen in the plots '13b' of FIG. 13 PSF functions differ depending on the field angle. Thus, the point spread functions are different (PSF0≠PSF1) for different field angles.

FIG. 14 is a schematic view of an optical unit of a device for extended depth of field imaging with a pupil zone divided into at least two zones, where point spread function (PSF) depends on depth of field; reference numeral 14a stands for point spread functions (PSF) as a function of depth of field for far position, central position and near position, and reference numeral 14b stands for point spread functions (PSF) as a function of field angle according to an embodiment of the disclosure.

FIG. 15A is a schematic view of spots in the image plane in accordance with point spread function (PSF) for the device for extended depth of field imaging according to FIG. 13 according to an embodiment of the disclosure.

Referring to FIG. 15A, which shows the appearance of spots in the image plane in accordance with PSF function for the imaging device according to FIG. 13, the spots differ from each other as a function of the field angle, but are the same in depth.

This capability of the optical unit of the imaging device according to the disclosure, i.e. independence of the produced image quality from the target object distance (depth of field) makes processing of images obtained from different distances less complicated.

According to another embodiment of the imaging device (see FIG. 14) with division of pupil zone into at least two zones, an optical unit is provided that illustrates the scheme for forming light beams L1, L2 with respective foci, where point spread function PSF depends on the depth of field. Each pupil zone (PZ1, PZ2) is defined by own focus (F1, F2) and aberration properties.

Moreover, each pupil zone corresponds to respective light beam L1, L2, for example, pupil zone PZ1 corresponds to light beam L1 and focus F1.

Functionality of the optical unit shown in FIG. 14 is illustrated in point spread function plots for far position, central position and near position, which have different PSF function shape (see plots '14a' in FIG. 14) as a function of depth of field, where PSF2, PSF0, PSF3 are PSF functions for far position, central position and near position, respectively. Thus, the point spread functions are different (PSF0≠PSF2≠PSF3) for different values of depth of field.

Furthermore, as clearly seen in plots '14b' of FIG. 14, illustrating the dependence of PSF function on the field angle, where PSF functions are approximately the same as a function of the field angle. Thus, point spread functions are invariant (PSF0~PSF1) for different field angles.

FIG. 15B is a schematic view of spots in the image plane in accordance point spread function (PSF) for the device for extended depth of field imaging according to FIG. 14 according to an embodiment of the disclosure.

Referring to FIG. 15B, the appearance of spots in the image plane according to PSF function for the imaging device according to FIG. 14, the spots are of the same size as a function of the field angle, but differ in depth.

This capability of the optical unit of the imaging device according to the disclosure, i.e. independence of the obtained image quality from the field of view, provides less complicated processing of produced images.

According to another embodiment of the imaging device, the features shown in FIG. 13 and FIG. 14 can be combined in one device, i.e. invariance of point spread function is ensured simultaneously in the field of view and in depth, which makes further image processing less complicated.

According to another embodiment, an optical unit of the imaging device also provides uniform modulation transfer function (MTF), which defines the dependence of modulation transfer coefficient on defocusing (z), i.e. MTF is independent of the amount of defocusing over the desired range (uniform MTF range in FIG. 15C).

FIG. 15C is a plot illustrating modulation transfer function (MTF), showing modulation transfer coefficient (T) versus defocusing (z) according to an embodiment of the disclosure.

According to another embodiment, an optical unit of the imaging device unit provides both uniform modulation transfer function and invariant point spread function (see FIG. 15C).

This capability of the optical unit of the imaging device according to the disclosure provides less complicated processing of the produced images.

Optical unit of the imaging device comprises a set of optical elements specifically arranged in space to provide required formation of beams (without sensor and processing unit). The optical elements can be lenses having a different surface profile, and/or a composite lens, and/or a diffractive optical element, and/or a holographic optical element, and/or a polarization element, and/or an amplitude-phase mask.

Composite lens is a structure consisting of at least two zones with different optical properties. Composite lens can be a bifocal lens, a progressive lens, a Fresnel lens.

Bifocal lens is a composite lens with two zones having different focal lengths.

Progressive lens is a composite lens consisting of several zones, featuring a focal length gradient.

Fresnel lens is a composite lens consisting of several stepped regions representing respective zones of continuous profile of a conventional lens surface.

Diffractive optical element is a diffractive microstructure that performs amplitude-phase modulation of transmitted or reflected light.

Holographic optical element is a diffractive optical element manufactured by light wave interference methods.

Diffractive optical element, and in particular holographic optical element having a small thickness of 5 μm, enables effective correction or introduction of chromatic aberrations.

Polarizing element is a device that changes the state of polarization. For example, a polarizer or a phase plate can be used as polarizing element. Polarizer is designed to produce polarized or partially polarized light. Phase plate introduces phase difference between orthogonal linearly polarized light components. In particular, a quarter-wave plate can be used as phase plate if the phase difference corresponds to a quarter of wavelength, or a half-wave plate can be used as phase plate if the phase difference corresponds to half a wavelength. Phase plate can be configured to convert light from p-polarization state to s-polarization state or vice versa, convert right circular polarization to left circular polarization or vice versa, convert linearly polarized light to circularly polarized one or vice versa.

Provision of a polarizing element in the optical unit according to the disclosure can ensure, for example, multiple passage of light through a small number of optical elements that make up the optical unit. The multiple passage of light makes it possible to reduce the total length of the optical unit and the imaging device as a whole, thereby ensuring compactness of the device, which is key requirement for smartphones.

Furthermore, polarizing element can be used as a polarizing filter, e.g. to eliminate glare.

Amplitude-phase mask is a device that performs amplitude-phase modulation of transmitted or reflected light.

Amplitude-phase masks include, for example, masks with a fourth-degree parabola phase profile, cubic phase mask, masks with concentric annular holes in the screen and designed to provide phase delay or amplitude modulation to ensure uniform modulation transfer coefficient over the required image depth. Presence of amplitude-phase masks in the optical unit provides optimization of the point spread function (PSF) shape.

Each optical element of the set of optical elements is made of an optically transparent material selected from one of optical glasses, optical crystals and polymers.

FIG. 16A is a schematic view of a device for extended depth of field imaging with a shutter without an image processing device according to an embodiment of the disclosure.

FIGS. 16B, 16C and 16D show plots illustrating modulation transfer functions (MTF) which define modulation transfer coefficient (T) versus defocusing (z) as a function of opening pupil zones, according to various embodiment of the disclosure.

In an embodiment of the disclosure, the optical unit comprises a shutter, for example, an optical shutter, preferably in the plane of aperture diaphragm or in the imaging device plane conjugate with it. Provision of an optical shutter enables adjusting the number of focal lengths of the device, i.e. control of opening or closing a definite number of pupil zones (PZ).

Referring to FIG. 16A, three pupil zones are provided: PZ1, PZ2 or PZ3; in this case, an intermediate image will be obtained at the sensor with the following MTF characteristics, i.e. contrast (T) versus defocusing (z) (see plots in FIG. 16B to 16D).

Plot in FIG. 16B corresponds to the embodiment where all three pupil zones are open, embodiment in FIG. 16C— where one pupil zone open, and embodiment in FIG. 16D— where pupil zones PZ2 and PZ3 are open.

Optical shutter enables variation in the focal length of the device without changing position of lenses or changing focal length of individual lenses.

Presence of an optical shutter in the optical unit results in decreased area of aperture diaphragm and loss of energy (luminosity) of the optical unit, which is further compensated for by image processing in the image processing unit.

According to the disclosure, pupil zones are divided into zones and subzones, while the pupil zones may have different shape and different distribution of optical power within the zone.

FIGS. 17A to 17D show maps of optical power distribution depending on the shape of optical zones according to various embodiments of the disclosure.

Figure 17A:
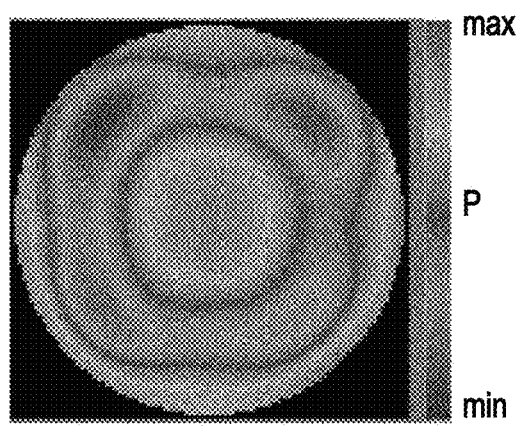

FIG. 17A shows a continuous multifocal asymmetric distribution of optical power, which can provide a specified distribution of point spread function (PSF) or modulation transfer function (MTF) according to an embodiment of the disclosure. This configuration is quite simple to manufacture.

Figure 17B:
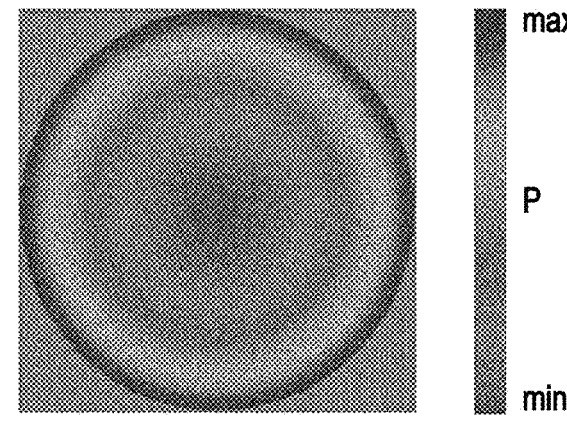

FIG. 17B shows a continuous multifocal axisymmetric power distribution according to an embodiment of the disclosure. This configuration is quite simple to manufacture.

Figure 17C:
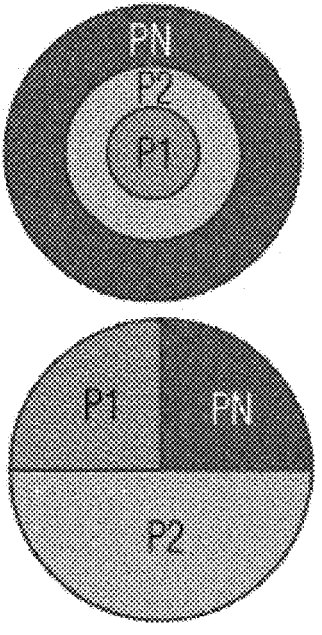

FIG. 17C shows discrete optical power distributions (P1, P2, PN), an axisymmetric with an annular pupil shape and a planar-symmetric with a segmented pupil shape, which enable separation in depth of images formed by different zones, and this power profile simplifies the image processing process according to an embodiment of the disclosure.

Figure 17D:
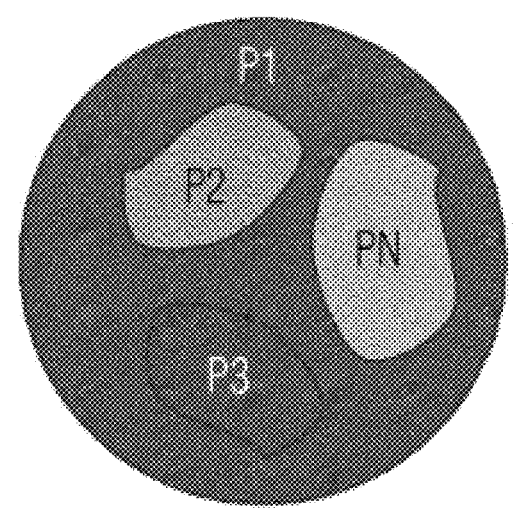

FIG. 17D shows a discrete multifocal (P1, P2, P3, PN) arbitrary power distribution, which can provide a specified distribution of point spread function (PSF) or modulation transfer function (MTF) according to an embodiment of the disclosure.

According to one embodiment of the disclosure, a device and method are provided for extended depth of field imaging, based on the joint design of the optical unit and the image processing unit, where both units are computed and adjusted together taking into account features and parameters of each unit (what is referred to as end-to-end optimization).

FIG. 18 is a schematic view of an imaging device comprising, arranged in succession, an optical unit containing a set of optical elements in the form of lenses with different surface profiles through which light beams L1, L2, and L3 pass, a sensor and an image processing unit according to an embodiment of the disclosure.

Referring to FIG. 18, parameters of the optical unit include: parameters of surfaces of optical elements, for example, lens surface radii ($r\_1$, $r\_2$, $r\_3$, $r\_4$, . . . $r\_i$), parameters of optical materials, for example, optical element refractive indices $n\_1$, $n\_2$, . . . $n\_i$), thicknesses of optical elements and distances between them in the optical unit ($d\_1$, $d\_2$, $d\_3$, . . . $d\_i$), L is the device length (axial distance between surface of the first optical element on the object side and image surface on the sensor).

Parameters of the sensor include, for example, wavelength sensitivity $k\_\lambda$, noise $\eta$, and sampling parameters S.

Parameters of the image processing unit include, for example, parameters of digital filters or weights ($W\_1$, $W\_2$, . . . $W\_i$) of neural network layers. Based on the above parameters of the optical unit, including modulation transfer function (MTF) or point spread function (PSF) depending on target object distance and parameters of the sensor, the image processing unit processes and then reconstructs the image.

Based on the above parameters of the optical unit, sensor and image processing unit, the imaging device provides image formation and a processing process such that dissimilarities between reconstructed image RI_C and initial image $I\_\lambda$ of the target object are minimized, for example, quadratic dissimilarity, as follows:

$$\|RI_C - I_\lambda\|^2.$$

Therefore, intermediate image formed at the sensor by the optical unit does not have to be of high quality and resolution, which simplifies requirements to optics, since image quality is corrected in the image processing unit.

Image processing and reconstruction is performed in the image processing unit such that evaluator in the form of dissimilarity norm between reconstructed image RI_C and initial image $I\_\lambda$ (reference image corresponding to ideal image of the target object), norms of their visual similarity VGG (detailed description of VGG see in https://arxiv.org/abs/1409.1556v6) or combinations thereof, are minimized.

As a non-limiting example, the processing unit may be implemented using artificial neural networks, Wiener filter, or a combination thereof.

One of embodiments is based on U-net-like network widely used in image processing, disclosed in https://arxiv.org/pdf/1505.04597.pdf.

FIG. 28 is a schematic view of seven-level neural network architecture according to an embodiment of the disclosure.

Referring to FIG. 28, when developing and analyzing the disclosure, the inventors used seven-level embodiment of the above network architecture, see FIG. 28. In the downsize direction (for input image), the network contains blocks of several convolutions (see FIG. 28, Type1 Block-Type3 Block), while in the upsize direction (Type4 Block-Type7 Block) are used. Detailed description of the blocks can be found in https://arxiv.org/pdf/1505.04597.pdf.

To train the network, a set of pairs of images (reference image and processed image) is used. In the training process, parameters of the blocks are determined, i.e. weights of layers $W\_1$, $W\_2$, . . . , $W\_i$ of the neural network, predominantly using gradient optimization methods, examples of which are disclosed in https://arxiv.org/pdf/1609.04747.pdf.

As a basic set of image pairs, high-quality images are used for reference images, and an image model on the sensor is used for processed images. Simplest model describing the optical device effect is a convolution with respective point spread function PSF with addition of parameterized noise.

Accounting for noise when constructing image at the sensor makes it possible to use the network to suppress noise during image processing, which is important in view of inevitable presence of noise and its effect on the processing result.

The evaluator is L1 norm (sum of modules of pixel difference between reconstructed and reference images), or a weighted combination of L1 norm and metric of visual perception of similarity (VGG), disclosed in: https://arxiv.org/abs/1409.1556v6), or combinations thereof. Alternative designs based on artificial neural networks with different network architectures and evaluators can be also used. They include, for example, quadratic norm, inverse evaluator, or pyramidal loss function.

It should be noted that processing of intermediate images of the object based on a convolutional neural network, for example, U-net-like network, is performed taking into account parameters of the optical unit and the sensor. Parameters of the optical unit include at least one of: radii of surfaces of optical elements, coefficients of aspheric surfaces of optical elements, thicknesses of optical elements, refractive indices of materials of optical elements, amount of dispersion of optical elements, distances between optical elements in the optical unit, device length representing axial distance between surface of the first optical element on the object side and image surface on the sensor, while sensor parameters include at least one of: spectral sensitivity, noise, sampling parameters.

An alternative to the neural network-based design for reconstructing image formed on the sensor is the use of conventional classical algorithmic approaches.

This is, for example, a method of reconstructing a blurred image using Wiener filter (Wiener, Norbert (1949). Extrapolation, Interpolation, and Smoothing of Stationary Time Series. New York: Wiley. ISBN 978-0-262-73005-1.), referred to as inverse convolution with Wiener filtering.

In the context of this approach, optimal estimate of sharp image x from image y formed at sensor is obtained as a result of applying Wiener filter (X, Y are respective images in frequency domain) as in Equation 1:

$$X = \left[ \frac{1 H^2}{H|H|^2 + S_n/S_f} \right] Y \qquad \text{Equation 1}$$

where H is the respective point spread function in frequency domain (i.e. modulation transfer function), and $S\_n/S\_f$ is the inverse signal-to-noise ratio of the imaging device;

X is the image spectrum in frequency domain after processing in the image processing unit, Y is the spectrum of intermediate image registered at the sensor.

Solutions based on Wiener filtering make it possible to implement operation of the image processing unit in real time, and thus, the solution can be used for implementing the function of preview of the reconstructed image by the user.

It should be noted that processing of intermediate images of the object based on Wiener filter is fulfilled based on parameters of the optical unit and the sensor. Parameters of optical unit include at least one of: radii of surfaces of the optical elements, coefficients of aspheric surfaces of the optical elements, thicknesses of the optical elements, refractive indices of materials of the optical elements, amount of dispersion of the optical elements, distances between the optical elements in the optical unit, device length representing axial distance between surface of the first optical element on the object side and image surface on the sensor, while parameters of sensor include at least one of: spectral sensitivity, noise, sampling parameters.

The disclosure also increases image processing speed when reconstructing the image formed on the sensor, if point spread function PSF can be represented in a separable form, i.e. if given function can be broken into two one-dimensional signals: a vertical and a horizontal projection.

FIG. 27 shows an example of separable point spread function (PSF) in the form of a horizontal and a vertical profile according to an embodiment of the disclosure.

Value of each pixel x[r, c] in the image is equal to respective point in horizontal projection horz[c] multiplied by respective point.

The use of separable point spread functions (PSFs) increases the speed of image data processing.

FIGS. 19A and 19B show images produced by an imaging device before and after processing by an image processing unit according to various embodiments of the disclosure.

FIG. 19A shows two images of a car and a garage door in the background, at medium distance, where the first (blurred) image is input image captured by camera, and the second (sharp) image is output image, i.e. reconstructed image after processing by the image processing unit according to an embodiment of the disclosure.

FIG. 19B shows two images of a balcony and house elements in the background, in far distance, where the first image is input image captured by camera, and the second (sharp) image is output image, i.e. reconstructed image after processing by the image processing unit according to an embodiment of the disclosure.

FIG. 20A shows an embodiment of optical unit of an imaging device, which comprises optical components arranged in succession along optical axis from the object side toward the image surface: aperture diaphragm, first lens (1_1), second lens (1_2), third lens (1_3), fourth lens (1_4), fifth lens (1_5) and sixth lens (1_6), where the first lens has a positive refractive power, with the surface facing the object side having a convex shape and the surface facing the image side having concave shape;

the second lens has a negative refractive power, with both the surface facing the object side and the surface facing the image side having concave shape;

the third lens has a positive refractive power, and the fourth lens has a meniscus shape;

the fifth and sixth lenses both have a meniscus shape near the optical axis, with the surface facing the object side having a convex shape near the optical axis and the surface facing the image side having a concave shape near the optical axis; and the axial distance between the object side surface of the first lens and the image surface is less than about 4.5 mm.

This optical unit design, in contrast to conventional EDOF devices (U.S. Pat. No. 8,559,118) disclosed in detail in this description, makes it possible to get a large depth of field (from 200 mm to infinity), a smooth MTF function, in contrast to conventional designs having a pronounced maximum in MTF function; furthermore, in this optical unit, MTF function in the sagittal and meridional sections substantially coincides, as clearly seen in FIG. 20C.

FIG. 20B is a plot illustrating MTF function defining modulation transfer coefficient (T) versus conventional defocusing (z) according to an embodiment of the disclosure.

FIG. 20C is a plot illustrating MTF function defining modulation transfer coefficient (T) versus defocusing (z) in the present imaging device (EDoF) according to an embodiment of the disclosure.

When developing the optical part of the imaging device, the inventors considered whether at least one of the lenses included in the optical unit may have aspheric and/or Zernike surface.

Profiles of aspheric surfaces of lenses of the inventive imaging device are described by Equation 2:

$$z = \frac{cr^2}{1 + \sqrt{1 - (1+k)c^2r^2}} + Ar^4 + Br^6 + \qquad \text{Equation 2}$$
$$Cr^8 + Dr^{10} + Er^{12} + Fr^{14} + Gr^{16} + Hr^{18} + Jr^{20}$$

where z—axial coordinate of a surface point relative to surface vertex, r—radial distance from optical axis, k—conical constant, c—surface curvature, A, B, S, D, E, F, G, H, J-aspheric coefficients.

Moreover, for k=0, the surface has a spherical profile, k=−1< to <0, the surface has the shape of an ellipsoid with the main axis on the optical axis (oblong ellipsoid (spheroid)), k=−1, the surface has the shape of a paraboloid, k=<−1, the surface has the shape of a hyperboloid.

The complex shape of lens surfaces, including aspheric ones, computed according to Equation 2, provides aberration correction and enhances quality of the image produced by the device according to the disclosure.

It should be noted that the use of aspheric surfaces provides correction of field aberrations with a small number of lenses, in this case five or six, thereby ensuring compactness of the inventive device.

Furthermore, lenses with aspheric surfaces made of optical plastic according to the disclosure are easily molded, which reduces the cost.

To manufacture lenses with aspheric surfaces from optical glass, the aspheric surface order is chosen to be lower due to the higher refractive index of the glass and low Abbe number, which also contributes to reduction of the cost of manufacture of the device according to the disclosure and smartphones using the devices.

Surface profiles of Zernike lenses of the present imaging device are described by Equation 3:

$$z = \frac{cr^2}{1 + \sqrt{1 - (1+k)c^2r^2}} + \sum_{j=1}^{66} C_{(j+1)}ZP_j \qquad \text{Equation 3}$$

where z is the coordinate of surface point along the optical axis relative to surface vertex, r is the radial distance from the optical axis, k is the conic constant, c is the vertex curvature, ZP_j is the j-th Zernike polynomial (range of j: 1 to 66), C_(j+1) is the coefficient for ZP_j.

Lens surfaces manufactured according to Equation 3, i.e. Zernike surfaces, provide correction of aberrations and enhance quality of the image produced by the device according to the disclosure.

It should be noted that the use of Zernike surfaces provides correction of field aberrations with a small number of lenses, in this case five or six, ensuring compact device according to the disclosure.

At the same time, these lenses are difficult to manufacture, but the contribution to the quality of the image produced is very high.

FIG. 21 shows plots illustrating MTF function defining modulation transfer coefficient (T) versus defocusing (z) for an optical unit having an aspheric surface and/or a Zernike surface imaging device (EDoF) according to an embodiment of the disclosure.

Referring to FIG. 21, as can be seen from the plots, the use of Zernike surface provides a more uniform modulation transfer function in the range of object distances from 200 mm to 5000 mm (corresponding depth of field from about −0.03 mm to 0.03 mm) compared to aspheric surface.

FIG. 22A shows plots of modulation transfer function MTF for the inventive optical unit, defining modulation transfer coefficient (T) versus defocusing (z) at frequency of 100 lines/mm for points with coordinates of 0, 1.9 and 2.5 mm according to an embodiment of the disclosure.

Solid line stands for the meridional section, and dotted line for the sagittal section.

FIG. 22B shows respective point spread function plots for a point on the axis at the (target) object distance d equal to 200 mm, 400 mm, 5000 mm according to an embodiment of the disclosure.

On the plots, x is the coordinate in the image plane, I is the point spread function value. It should be noted that there is substantially no side peaks for far object (d=5000 mm), which provides a naturally looking bokeh effect (without images of ring and oval-shaped point objects).

FIG. 22C shows plots illustrating optical unit distortion imaging device (EDoF) according to an embodiment of the disclosure.

The abscissa shows the distortion value in percent, and the ordinate shows the image size in mm. In one embodiment, the maximum image size of 2.78 mm corresponds to the field angle of 40 degrees (field of view of 80 degrees). In this case, the distortion does not exceed 2% for the optical unit.

FIG. 24A is a plot of point spread function (PSF) with minimized side lobes of an optical unit of a device for extended depth of field imaging according to an embodiment of the disclosure.

Referring to FIG. 24, a preferred embodiment of the present imaging device (see FIG. 18) is defined by point spread function (PSF) in out-of-focus position with minimal side lobes, which is shown in the plot of FIG. 24A. The plot clearly illustrates maximum value P of side lobe peaks (level of side lobes or value of side peaks) which is less than 0.1*A, where A is the maximum value of PSF function (or central peak), i.e. P≤0.1*A, resulting in the absence of ring or semi-ring halos on the image of object points.

This effect is achieved through the use of a multifocal optical unit with multiple pupil zones. As a result, naturally looking bokeh effect is obtained in intermediate blurred image of the object at output of the optical image processing unit.

Preferred embodiment of the present imaging device (see FIG. 18) is also defined by modulation transfer function (MTF).

FIG. 24B is a plot of MTF function versus defocusing (depth of field) illustrating smooth MTF curve. Here, non-uniformity U of MTF function, depending on focal lengths in a given range of depth of field determined by focal lengths, is less than 20% in the range of frequencies 0.5N-0.9N, where N is the Nyquist frequency.

In this case, nonuniformity U is determined according to the following equation:

$$U = (\text{max} - \text{min})/(\text{max} + \text{min})*100\%,$$

where max is maximum value of MTF function in given range, min is minimum value of MTF function in given range.

In these conditions, the range of focal depth is from −0.03 mm to 0.03 mm, and respective depth of field is from 200 mm to 5000 mm.

The plots presented in FIG. 24A, 24B, were obtained based on data from experiments carried out by the inventors when preparing the disclosure.

Therefore, the inventors have developed a method and device for extended depth of field imaging, which offer the following advantages:

no movement of optical elements is required, no complex optics (additional optical elements) are required, optical unit with extended depth of field without autofocus is provided, no focusing delay, fast reconstruction algorithm, no need for user interaction, no control over the process of capturing image by the smartphone user is required (i.e. the user does not need to select the focus area), the object is always in focus, regardless of the distance to camera, a simple image data processing algorithm, inexpensive, compact imaging device applicable for mass production.

FIG. 23A is a schematic view of an optical unit with the entrance pupil divided into two pupil zones (PZ1, PZ2) and a sensor of an imaging device according to an embodiment of the disclosure.

Referring to FIG. 23A, beams enter the optical unit, conventionally shown as a single lens, through the entrance pupil located in the object space and divided into two zones. Two parallel beams (the number of beams matches the number of pupil zones, and their number is not limited to the example shown in FIG. 23A) pass through the optical unit in the form of a set of lenses (FIG. 23A conventionally shows a single lens). The point of intersection of rays in the beam sets focal length EFL (EFL1 for the first light beam L1 and EFL2 for the second light beam L2), measured from principal plane of the optical unit to the point of intersection of rays in the beam along the optical axis. Variation in the optical power P or the focal length EFL as a function of pupil coordinates (x, y) specifies an optical power distribution map or a focal length distribution map, respectively, as shown in FIGS. 23B and 23D. The sensor is disposed at distance z' from the optical unit and configured to capture images formed by the optical unit through pupil zones (PZ1, PZ2). In this case, different focal lengths correspond to different distances z in the object space, where z=z'/EFL^2. Thus, the sensor contains information about target objects at different distances, but the image formed at the sensor is blurred, as already detailed in the description. "Blur" level of the image is described by point spread function (PSF).

FIGS. 23B, 23C, 23D show optical power distribution maps of the optical unit according to FIGS. 23B to 23D of the imaging device according to various embodiments of the disclosure.

Referring to FIGS. 23B, 23C, and 23D, optical power distribution map (P) can be represented as a function of pupil coordinates from focal length (EFL) or P=1/EFL, as can be clearly seen in plots of FIG. 23B, FIG. 23C. FIG. 23D shows a map of focal length distribution as a function of pupil coordinates. FIG. 23C shows focal length distribution in the sagittal section of the pupil (i.e. this is profile of focal length distribution on the map from FIG. 23D with zero y coordinate on the pupil).

Level of blur can be described by point spread function PSF (x, y), where x, y are coordinates on the sensor. Point spread function depends on object distance and field angle at which the object is observed. PSF (x, y) function is defined by form of pupil and aberration properties (for example, wave aberrations (OPD)). Wave aberrations (OPD) of each pupil zone define or specify image quality in accordance with the optical device characteristics for distance range d1, d2, d3, . . . dN. PSF function describes the response of the optical unit to a point object. The book: Goodman J. W. "Introduction to Fourier Optics" second edition, New York: McGraw-Hill, 1996, p. 145, describes in details how point spread function (PSF) can be obtained.

Intensity distribution or intensity of image I_C as a function of coordinates in the image (hereinafter referred to as image I_C), formed by the optical unit on at least a part of the sensor, within which the point spread function can be considered invariant (i.e. point spread function does not depend on field angle) can be represented as a convolution of object intensity distribution I_λ (or object intensity reduced to the sensor, which matches ideal image of the object) and function PSF: $I_C = I_\lambda*(PSF)_\lambda(x,y)$. It should be noted that λ in subscript means wavelength dependence. Considering wavelength sensitivity of the sensor k_λ, i.e. spectral sensitivity, formed image, as in Equation 4:

$$I_C = \int I_\lambda * (PSF)_\lambda (x, y) k_\lambda d_\lambda \qquad \text{Equation 4}$$

where I_C is image intensity (hereinafter referred to as image) formed on at least part of sensor, I_λ is object intensity depending on wavelength (λ) formed on at least part of the sensor, (PSF)_λ (x, y) is point spread function depending on the wavelength (λ), k_λ is sensitivity of the sensor to wavelength (λ), and d_λ is radiation wavelength differential.

Image I_C formed at the sensor is digitized, i.e. becomes discrete with sensor pixel repetition rate, sampled by level (256 sampling levels in the best mode), integrated over sensor pixels and becomes noisy η, yielding resulting (intermediate) image: $Y_C=S(I_C)+\eta$, where S is sampling operator, η—noise, I_C—intensity of the image formed on at least part of the sensor. Resulting image is sent to image processing unit.

FIGS. 25A to 25E illustrate a process of forming image by the optical unit and registering at the sensor, according to various embodiments of the disclosure.

Referring to FIGS. 25A to 25E, FIG. 25A is a schematic view of an imaging process taking place in the optical unit and at the sensor. In FIG. 25C, the object under consideration is conditionally divided into parts, within which point spread function can be considered invariant, i.e. PSF function is treated as invariant. Optical unit of the imaging device can be mathematically represented as a convolution of intensity distribution on the object and point spread function (FIG. 25B). PSF function is computed for each sensor part (see FIG. 25C). Sensor is defined by spectral sensitivity k_λ and introduces (adds) noise (η) to the intermediate image (FIG. 25D). The image formed at the sensor is digitized (S). FIG. 25E shows formation of resulting intermediate image at the sensor.

$$Y_C = S(I_C) + \eta, \; I_C = \int I_\lambda * (PSF)_\lambda(x, y) k_\lambda d_\lambda$$

FIG. 26 is a schematic view of object image (Y_C) formed at the sensor (see resulting intermediate image in FIG. 25D and reconstructed image produced after processing in the image processing unit) according to an embodiment of the disclosure.

Thus, using information about registered image by sensor (Y_C) and the dependence of point spread function from coordinates on the sensor PSF (x, y), image processing unit is capable of processing images such that dissimilarity between reconstructed image RI_C and ideal image I_λ of the object is minimized, for example:

$$\min\|RI_C - I_\lambda\|^2.$$

INDUSTRIAL APPLICABILITY

Device and method for extended depth of field imaging can be used in compact, portable devices, such as tablet computers, laptops, teleconferencing systems, in addition, it can be used for capturing photo and video with EDOF cameras of smartphones running Android, iOS, HarmonyOS and similar operating systems, and in other devices which need to capture objects at different distances in real time. Furthermore, the disclosure can be used in security devices, closed circuit television (CCTV) cameras, devices for taking biometric data, in microscopy, in security systems for iris recognition on the move with instant object fixation without focusing and contactless fingerprinting.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A device for extended depth of field imaging, the device comprising:

an optical device configured to simultaneously form intermediate images of an object at different distances with a blur effect on at least parts of images of the object, the optical device comprising at least one optical element and at least two pupil zones formed to provide a predetermined distribution of optical powers and aberrations within each of the at least two pupil zones, based on which a point spread function is formed, defined by a curve with minimized side peaks compared to a central peak in a given range of object distances, each of the at least two pupil zones corresponding to a respective given range of object distances and a respective given range of field angles, wherein each of the pupil zones (PZ1, PZ2) is divided into subzones, each subzone having its own focus and beam;

a sensor configured to simultaneously register the intermediate images formed by the optical device from different object distances and at different field angles; and an image processor communicatively connected to the sensor and the optical device, wherein the image processor is configured to:

process the intermediate images of the object with the blur effect on at least parts of the images of the object registered by the sensor, the intermediate images being processed based on an obtained point spread function over the given range of object distances and field angles, and reconstruct resulting images without the blur effect at output regardless of object distances, and wherein the minimized side peaks of the point spread function, formed by the optical device, do not exceed 10% of the central peak in the given range of object distances.

2. The device of claim 1, wherein the given range of object distances is from 400 millimeters (mm) to 5000 mm.

3. The device of claim 1, wherein the given range of field angles is from −40 to +40 degrees.

4. The device of claim 1, wherein the optical device is further configured to form an invariant point spread function independent of an object distance over the given range of object distances.

5. The device of claim 1, wherein the optical device is further configured to form an invariant point spread function independent of a field angle.

6. The device of claim 1, wherein the optical device is further configured to form an invariant point spread function independent of a field angle and an object distance.

7. The device of claim 1, wherein the optical device is further configured to form a uniform modulation transfer function (MTF) independent of an object distance.

8. The device of claim 1, wherein the optical device is further configured to simultaneously form intermediate images of the object at different distances with the blur effect on an entire image of the object.

9. The device of claim 1, wherein the at least one optical element comprises at least one of a lens with different surface profiles, a composite lens, a diffractive optical element, a holographic optical element, a polarizing element, or an amplitude-phase mask.

10. The device of claim 9, wherein optical elements of the optical device comprise, arranged along an optical axis from an object side toward an image surface, a first lens, a second lens, a third lens, a fourth lens, a fifth lens, and a sixth lens, wherein the first lens has a positive refractive power, with a surface facing the object side having a convex shape and a surface facing an image side having a concave shape,;

wherein the second lens has a negative refractive power and with both a surface facing the object side and a surface facing the image side having the concave shape,;

wherein the third lens has a positive refractive power, wherein the fourth lens has a meniscus shape, and wherein each of the fifth and sixth lenses has the meniscus shape near the optical axis, with a surface facing the object side having the convex shape near the optical axis and a surface facing the image side having the concave shape near the optical axis.

11. The device of claim 1, further comprising:

a shutter disposed in a plane of an aperture diaphragm or disposed in an imaging device plane conjugate with the shutter, wherein the shutter is configured to control an opening or closing of a given number of pupil zones.

12. The device of claim 1, wherein the sensor is a matrix photodetector.

13. The device of claim 12, wherein the matrix photodetector is configured to detect electromagnetic radiation in a range of 0.4-0.7 micrometers (μm), and wherein a sensor pixel size is from 0.7 μm to 1.5 μm.

14. The device of claim 1, wherein the image processor is further configured to:

process the intermediate images of the object and reconstruct resulting images at output based on at least one of a convolutional neural network or Wiener filter, parameters of which are predetermined based on design parameters of the optical device and the sensor.

\* \* \* \* \*